(12) United States Patent
Lo et al.

(10) Patent No.: US 11,110,651 B2
(45) Date of Patent: Sep. 7, 2021

(54) METHOD OF PERFORMING POWDER BED FUSION PROCESS

(71) Applicant: NATIONAL CHENG KUNG UNIVERSITY, Tainan (TW)

(72) Inventors: Yu-Lung Lo, Tainan (TW); Hong-Chuong Tran, Tainan (TW)

(73) Assignee: NATIONAL CHENG KUNG UNIVERSITY, Tainan (TW)

(*) Notice: Subject to any disclaimer, the term of this patent is extended or adjusted under 35 U.S.C. 154(b) by 224 days.

(21) Appl. No.: 16/568,271

(22) Filed: Sep. 12, 2019

(65) Prior Publication Data
US 2020/0198230 A1 Jun. 25, 2020

Related U.S. Application Data

(60) Provisional application No. 62/782,323, filed on Dec. 19, 2018.

(51) Int. Cl.
| | |
|---|---|
| *B29C 64/153* | (2017.01) |
| *B23K 26/342* | (2014.01) |
| *B29C 64/268* | (2017.01) |
| *B33Y 80/00* | (2015.01) |
| *B33Y 10/00* | (2015.01) |
| *B33Y 30/00* | (2015.01) |

(52) U.S. Cl.
CPC .......... *B29C 64/153* (2017.08); *B23K 26/342* (2015.10); *B29C 64/268* (2017.08); *B33Y 10/00* (2014.12); *B33Y 30/00* (2014.12); *B33Y 80/00* (2014.12)

(58) Field of Classification Search
CPC ................................................ B29C 64/153
See application file for complete search history.

(56) References Cited

PUBLICATIONS

H.-C. Tran et al., "Analysis of Scattering and Absorption Characteristics of Metal Powder Layer for Selective Laser Sintering," IEEE/ASME Transactions on Mechatronics, vol. 22, pp. 1807-1817, Aug. 2017.
A.V. Gusarov et al., "Contact thermal conductivity of a powder bed in selective laser sintering," International Journal of Heat and Mass Transfer, vol. 46, pp. 1103-1109, 2003.
I. Roberts et al., "A three-dimensional finite element analysis of the temperature field during laser melting of metal powders in additive layer manufacturing," International Journal of Machine Tools and Manufacture, vol. 49, pp. 916-923, 2009.

(Continued)

*Primary Examiner* — Larry W Thrower
(74) *Attorney, Agent, or Firm* — CKC & Partners Co., LLC

(57) ABSTRACT

A method of performing powder bed fusion process is provided. A powder bed and a group of information of the powder bed are obtained. A powder bed simulation is performed to obtain a thickness of the powder bed and a packing density. Then, a group of parameters of a laser is obtained. A Ray Tracing simulation for the powder layer and a heat transfer simulation are performed. A first surrogate model is constructed to obtain first processing maps. The points in the first processing maps with the depths of the melt pool that are greater than a predetermined depth value and smaller than a laser beam radius are a first group of parameter values. A parameter setting operation is performed by using the first group of parameter values. A laser melting operation is performed, and a temperature distribution is measured by using an infrared thermal camera.

19 Claims, 19 Drawing Sheets

(56) References Cited

PUBLICATIONS

J. Yin et al., "A finite element model of thermal evolution in laser micro sintering," The International Journal of Advanced Manufacturing Technology, vol. 83, pp. 1847-1859, 2016.

H.-C. Tran et al., "Heat transfer simulations of selective laser melting process based on volumetric heat source with powder size consideration," Journal of Materials Processing Technology, vol. 255, pp. 411-425, 2018.

Ali Foroozmehr et al., "Finite element simulation of selective laser melting process considering optical penetration depth of laser in powder bed" Materials & Design, vol. 89, pp. 255-263, 2016.

C. Kamath, "Data mining and statistical inference in selective laser melting," The International Journal of Advanced Manufacturing Technology, vol. 86, pp. 1659-1677, 2016.

I. Yadroitsev et al., "Single track formation in selective laser melting of metal powders," Journal of Materials Processing Technology, vol. 210, pp. 1624-1631, 2010.

L. C. Leonard et al., "Roughness measurement of metallic surfaces based on the laser speckle contrast method," Optics and Lasers in Engineering, vol. 30, pp. 433-440, 1998.

Di Wang et al., "Study on energy input and its influences on single-track, multi-track, and multi-layer in SLM," The International Journal of Advanced Manufacturing Technology, 58 (9-12), pp. 1189-1199, 2012.

I. Yadroitsev et al., "Hierarchical design principles of selective laser melting for high quality metallic objects" Additive Manufacturing, vol. 7, pp. 45-56, 2015.

J. Zhou et al., "Numerical simulation of random packing of spherical particles for powder-based additive manufacturing," Journal of manufacturing science and engineering, vol. 131, 8 pages, Jun. 2009.

H. Krauss et al., "Thermographic process monitoring in powderbed based additive manufacturing" in AIP Conference Proceedings, 2015, pp. 177-183.

METHOD OF PERFORMING POWDER BED FUSION PROCESS

RELATED APPLICATIONS

This application claims priority to U.S. Provisional Application Ser. No. 62/782,323, filed Dec. 19, 2018, which is herein incorporated by reference in its entirety.

BACKGROUND

Field of Invention

The present invention relates to a method of performing powder bed fusion process. More particularly, the present invention relates to an additive manufacturing method using selective laser melting (SLM) with optimal SLM parameters.

Description of Related Art

Selective laser melting (SLM) process is an additive manufacturing technique in which three dimensional (3D) part are produced by selectively melting defined areas of a metal powder layer using a controlled laser beam. Selective laser melting process involved with laser absorption and scattering in a powder bed, heat conduction, melting and fusion of powder particles, formation and solidification of a melt pool and so on. SLM parameters can be categorized into three main groups, which are laser parameters (i.e. a laser power, a laser spot size, laser beam profile, a scan speed, a scan spacing and a scan pattern), powder bed parameters (i.e. a powder size distribution and a thickness of the powder layer) and material properties of a substrate and a powder bed including both thermal properties (e.g., density, specific heat capacity, thermal conductivity and latent heat of fusion) and optical properties (e.g., refractive index of the powder particles for different laser wavelengths). The above parameters have a significant impact on density of fabricated components.

Conventionally, the optimal parameters for SLM processing are found through experimental study. However, if the material or the powder size distribution is changed, or the new machine with a different configuration is used, the entire experimental procedure should be repeated to find other optimal parameters. In other words, the conventional method is really time-consuming and tedious.

Therefore, there is a need to have a systematic method which can reduce time and cost in finding the optimal parameters for producing high density parts in SLM process.

SUMMARY

The invention provides a method of performing powder bed fusion process. First, a powder bed is provided, in which the powder bed includes a substrate and a powder layer. The powder layer contains a plurality of powders, and the powder layer is deposited on the substrate. Then, a group of information of the powder bed is obtained, in which the group of information of the powder bed includes a powder size distribution, material properties of the powders, and shape of the powders. Afterwards, a powder bed simulation is performed to obtain a packing density corresponding to different thickness of the powder layer by using the group of information of the powder bed according to a first algorithm. The packing density of the powder bed is higher than a predetermined packing density value. Then, a group of parameters of a laser is obtained, in which the group of parameters of the laser includes a laser type, and values of a laser power, a scanning speed, and a laser spot size.

Subsequently, a Ray Tracing simulation for the powder layer is performed to obtain an absorptivity profile along a depth of the powder layer by using material properties of the powders, the group of parameters of the laser, and the thickness of the powder bed according to a second algorithm. Then, a heat transfer simulation is performed to obtain a peak temperature and a dimension of a melt pool by using the group of parameters of the laser, a temperature of the substrate, the thickness of the powder layer, and the absorptivity profile according to a third algorithm. The dimension of the melt pool includes a length, a contact width, and a depth of the melt pool. Afterwards, a first surrogate model is constructed to obtain a plurality of first processing maps for different thickness of the powder layer by inputting the peak temperature and the dimension of a melt pool into artificial neural networks. The first processing maps include a number of points, and each point is corresponding to a combination of a scanning speed value and a laser power value.

Subsequently, a depth of the melt pool of each point in the first processing maps is calculated by inputting the scanning speed value and the laser power value into the first surrogate model. Then, the depth of the melt pool of each point is compared with a predetermined depth value. When the depths of the melt pool of the points are smaller than the predetermined depth value, the points in the first processing maps are not applicable. When the depths of the melt pool of the points are greater than the predetermined depth value, the depths of the melt pool are subsequently compared with a laser beam radius. When the depths of the melt pool of the points are greater than the laser beam radius, the points in the first processing maps are not applicable. When the depths of the melt pool of the points are smaller than the laser beam radius, performing a parameter setting operation by setting the points in the first processing maps as a first group of parameter values. Subsequently, cycles of selective laser melting operation on a workpiece is performed. Each cycle of selective laser melting operation includes the parameter setting operation, a laser melting operation, and a temperature measuring operation. The parameter setting operation is performed by a controller using the first group of parameter values. Then, the laser melting operation on the powder layer of the workpiece is performed. Afterwards, a temperature distribution on a top surface of a solidified layer is measured by using an infrared thermal camera, in which the solidified layer is the powder layer melted by the laser and solidified.

In some embodiments, a ratio of the first group of parameter values to the points of the first processing maps is compared with a predetermined ratio. When the ratio of the first group of parameter values to the points of the first processing maps is greater than the predetermined ratio, the greatest thickness of the powder bed is used to calculate a built-plate drop down distance. When the ratio of the first group of parameter value to the points of the first processing maps is smaller than the predetermined ratio, the thickness of the powder bed is re-adjusted.

In some embodiments, a ratio of a diameter to the length of the melt pool is calculated. The diameter of the melt pool is determined by the dimension of the melt pool, and the dimension of the melt pool is predicted by using the first group of parameter values. Stability of the melt pool with the first group of parameter values is judged by using the dimension of the melt pool according to a stability criterion algorithm. When the points of the first group of parameter values do not satisfy the stability criterion algorithm, the points are removed from the first group of parameter values. When the points of the first group of parameter values satisfy the stability criterion algorithm, the peak temperature is compared with a predetermined temperature. When the peak temperature is higher than the predetermined temperature, the points are removed from the first group of parameter values. When the peak temperature is lower than the predetermined temperature, performing the parameter setting operation by setting the points as the first group of parameter values.

In some embodiments, before performing the cycles of selective laser melting operation, the heat transfer simulation is performed by using a number of temperatures of the substrate, and the first surrogate models are constructed to obtain the first processing maps corresponding to a range of temperatures. Subsequently, the first groups of parameter values corresponding to the temperatures are overlapped with each other, and a second group of parameter values is obtained. Afterwards, the parameter setting operation is performed by a controller using the second group of parameter values.

In some embodiments, when the temperature distribution of the solidified layer is within a range of the temperatures, the cycles of selective laser melting operation is performed on the workpiece.

In some embodiments, speckle images are obtained by a digital camera to compare surface roughness of the workpiece after performing a single scan track on the workpiece by using the first group of parameter values.

In some embodiments, the first group of parameter value is divided into two subgroups according to the scanning speed values. The surface roughness of the workpieces fabricated by using the two subgroups of first group of parameter values are compared respectively. Afterwards, the parameter setting operation is performed by using one of the two subgroups of the first group of parameter values, wherein one of the two subgroups of the first group of parameter values is used to obtain a portion of the workpieces having lower surface roughness.

In some embodiments, a double-scanning heat transfer simulation is performed to obtain another peak temperature and dimensions of the melt pool by using one of the two subgroups of the first group of parameter values.

In some embodiments, the double-scanning heat transfer simulation includes a unidirectional mode and a bi-directional mode.

In some embodiments, second surrogate models are constructed to obtain a plurality of second processing maps by inputting the another peak temperature and the dimensions of the melt pool into the artificial neural networks, wherein the second processing maps include a number of points, in which each point is corresponding to a combination of a scanning length value and a hatching space value.

In some embodiments, before performing the parameter setting operation, the another peak temperature is compared with an evaporation point of the powders. When the another peak temperature is lower than the evaporation point, the points of the second processing maps area first set of parameter values. When the another peak temperature is higher than the evaporation point, the points of the second processing maps are removed from the first set of parameter values. Afterwards, the parameter setting operation is performed by using the first set of parameter values.

In some embodiments, before performing the parameter setting operation, differences in depths of the melt pools are further calculated, and then the differences in depths are compared with a predetermined difference. When the differences in depths are lower than the predetermined difference, the points of the second processing maps are the first set of parameter values. When the differences in depths are greater than the predetermined difference, the points of the second processing maps are removed from the first set of parameter values. Afterwards, the parameter setting operation is performed by using the first set of parameter values.

In some embodiments, overlap rates of the melt pools are further calculated, and then the overlap rates are compared with a predetermined rate. When the overlap rates are greater than a predetermined rate, the points of the second processing maps are the first set of parameter values. When the overlap rates are lower than the predetermined rate, the points of the second processing maps are removed from the first set of parameter values. Afterwards, the parameter setting operation is performed by using the first set of parameter values.

In some embodiments, the absorptivity of the substrate is not 0.

In some embodiments, the first algorithm includes a sequential addition model.

In some embodiments, the second algorithm includes Monte Carlo Ray Tracing Simulation.

In some embodiments, the third algorithm includes finite element heat transfer simulation.

In some embodiments, the powders include metal, polymer material and/or ceramic material.

In some embodiments, the shape of the powders includes irregular shape and spherical shape.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
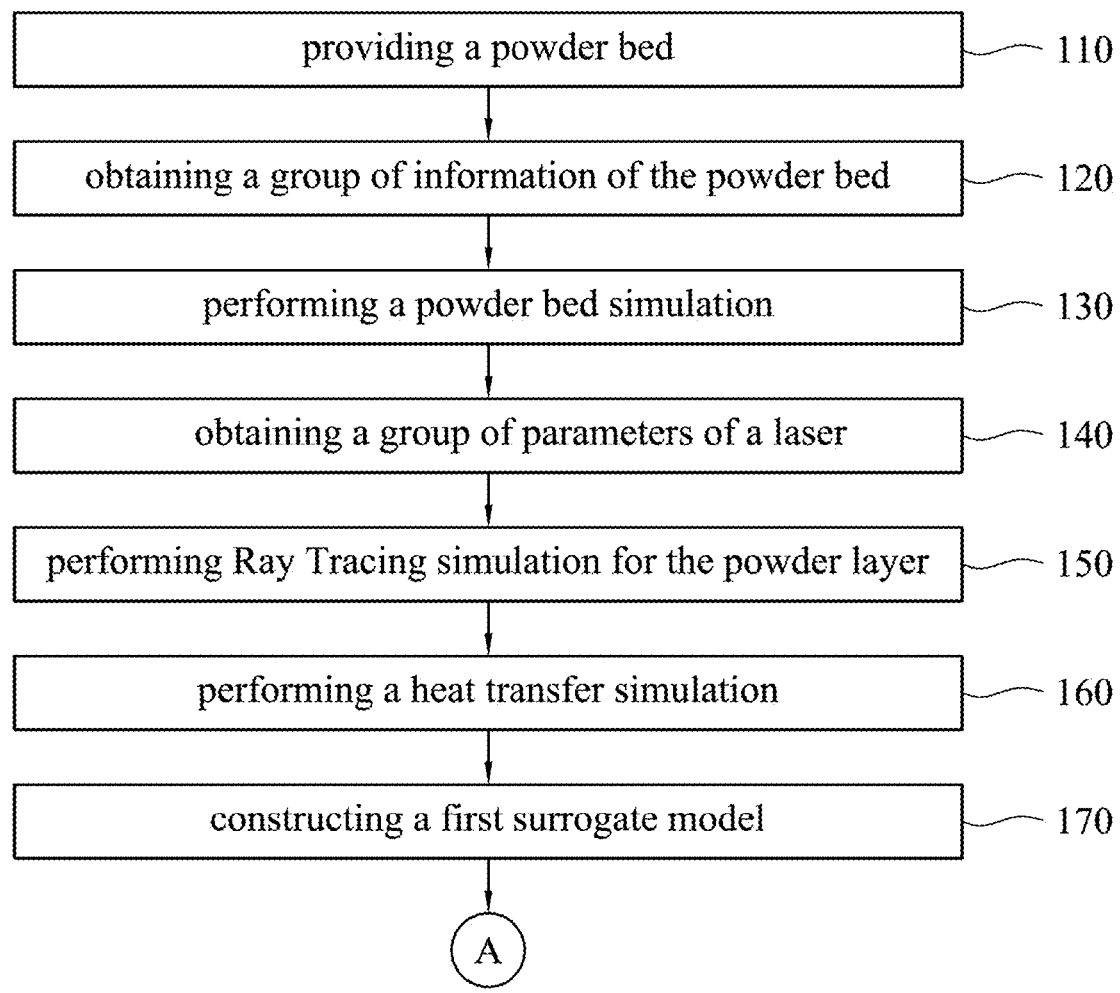
FIGS. 1A-1D show a flow chart of a method of performing a selective laser melting process according to some embodiments of the present invention.

Reference will now be made in detail to the present embodiments of the invention, examples of which are illustrated in the accompanying drawings. Wherever possible, the same reference numbers are used in the drawings and the description to refer to the same or like parts.

To avoid using the conventional experimental additive manufacturing method which requires so much time and expense, a simulation model is used to determine the optimal parameters for additive manufacturing method, such as selective laser melting (SLM) process. A systematic methodology for determining the optimal parameter settings including laser power, scanning speed, powder layer thickness, hatch space, and scan length, for a given SLM processing and powder bed material is provided in embodiments of the present invention.

In the systematic methodology, at first, an optimal range of a powder layer thickness is determined. In an embodiment of the present invention, a modified sequential addition model and a ray-tracing simulation approach are used to determine the powder layer thickness based on calculated packing density and absorptivity of a powder bed. Subsequently, several combinations of the laser power and scanning speed in a designed space of the considered SLM system is used to determine peak temperature and dimensions of a melt pool by using a heat transfer model. Then, the simulation results are used to train artificial neural networks (ANNs) for surrogate models to predict the dimensions of the melt pool and the peak temperature, respectively, for numerous combinations of the laser power and scanning speed. Subsequently, several combinations of the hatch space and the scan length are used to predict melt pool features, which include the peak temperature, depth and overlap rate, by a three-dimensional (3D) finite element model. Similarly, the simulation results are used to train ANNs for surrogate models to predict the melt pool features for numerous combinations of the hatch space and the scan length within the design space.

Figure 1B:
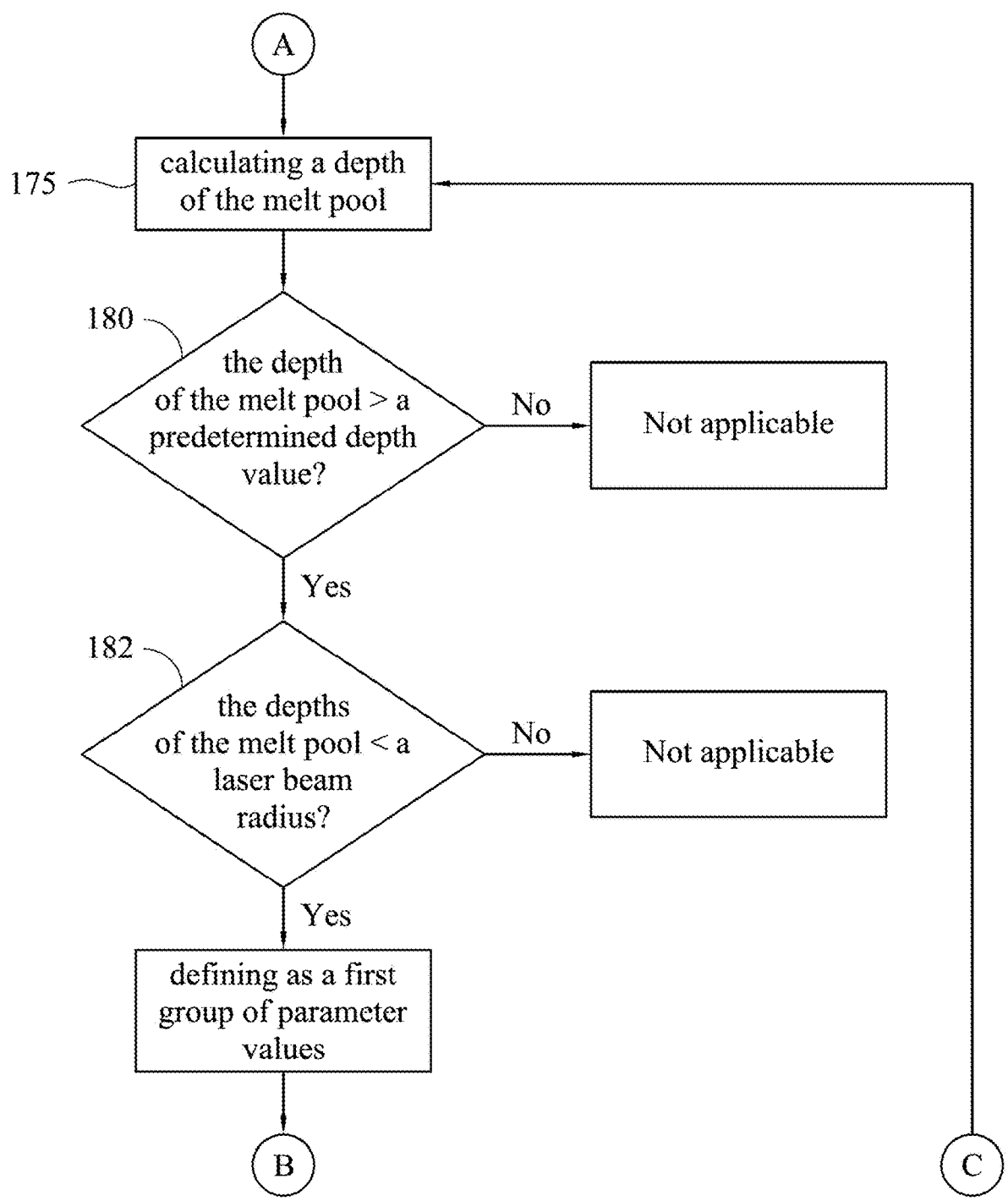
Figure 1C:
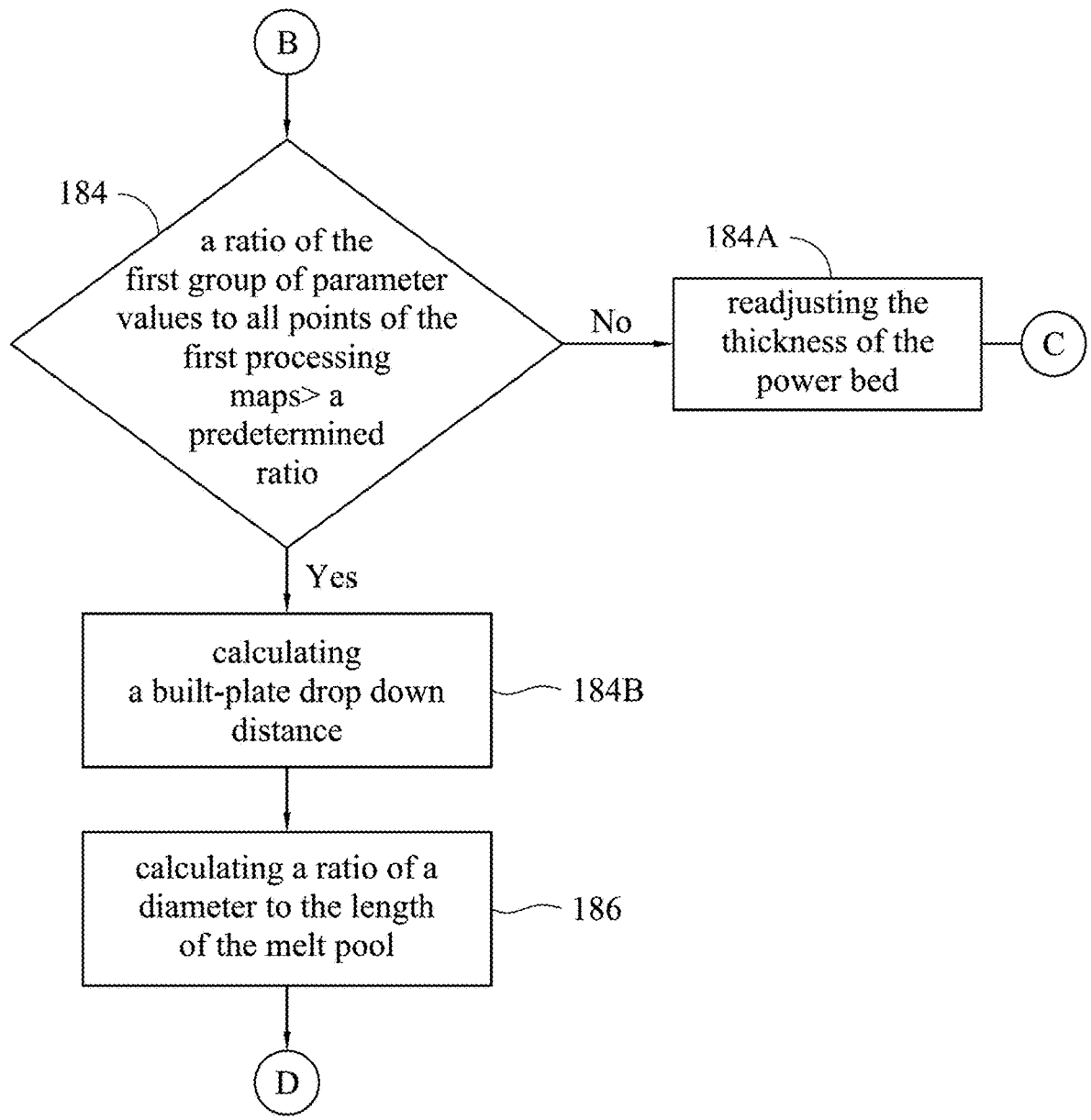
Figure 1D:
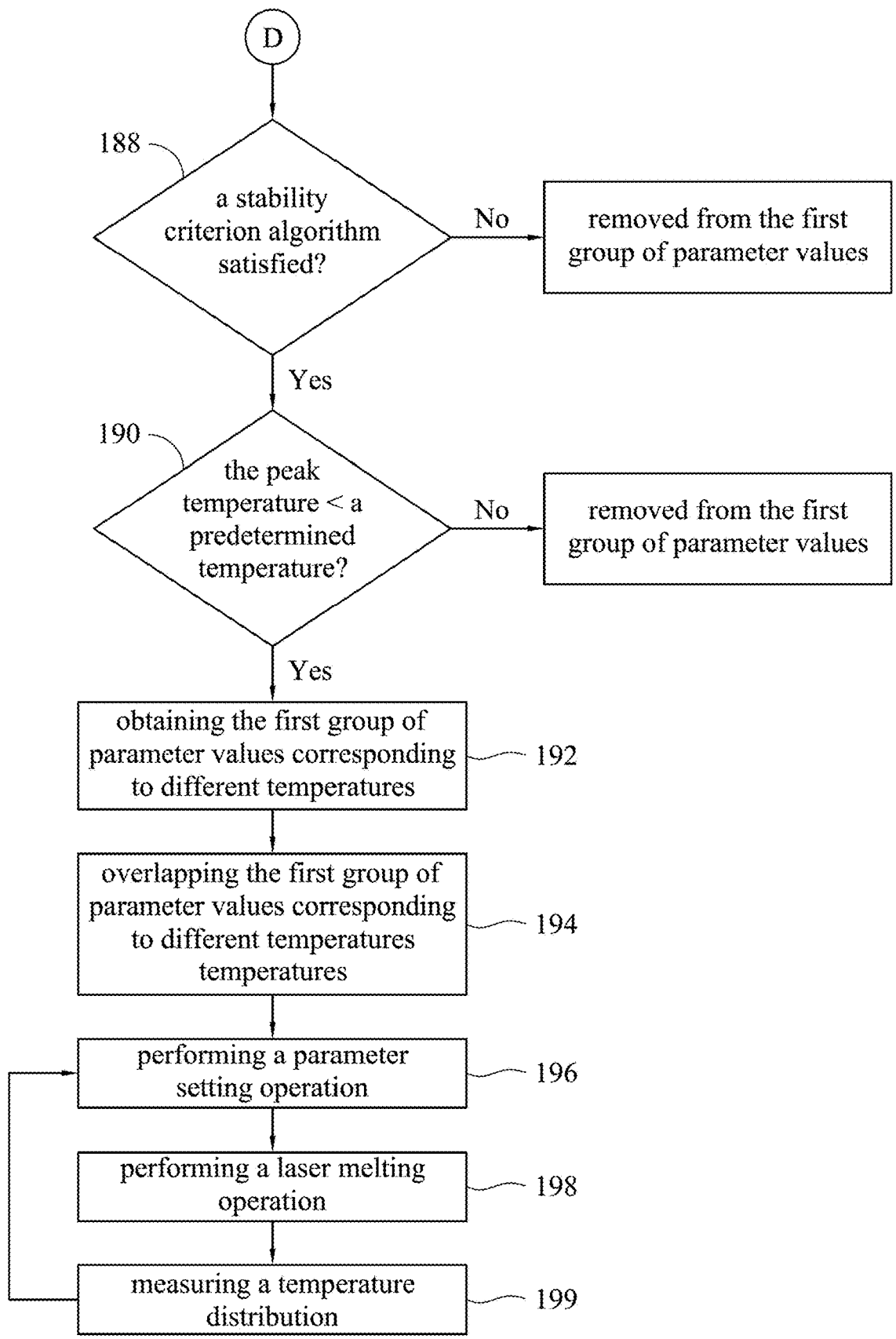
Figure 2:
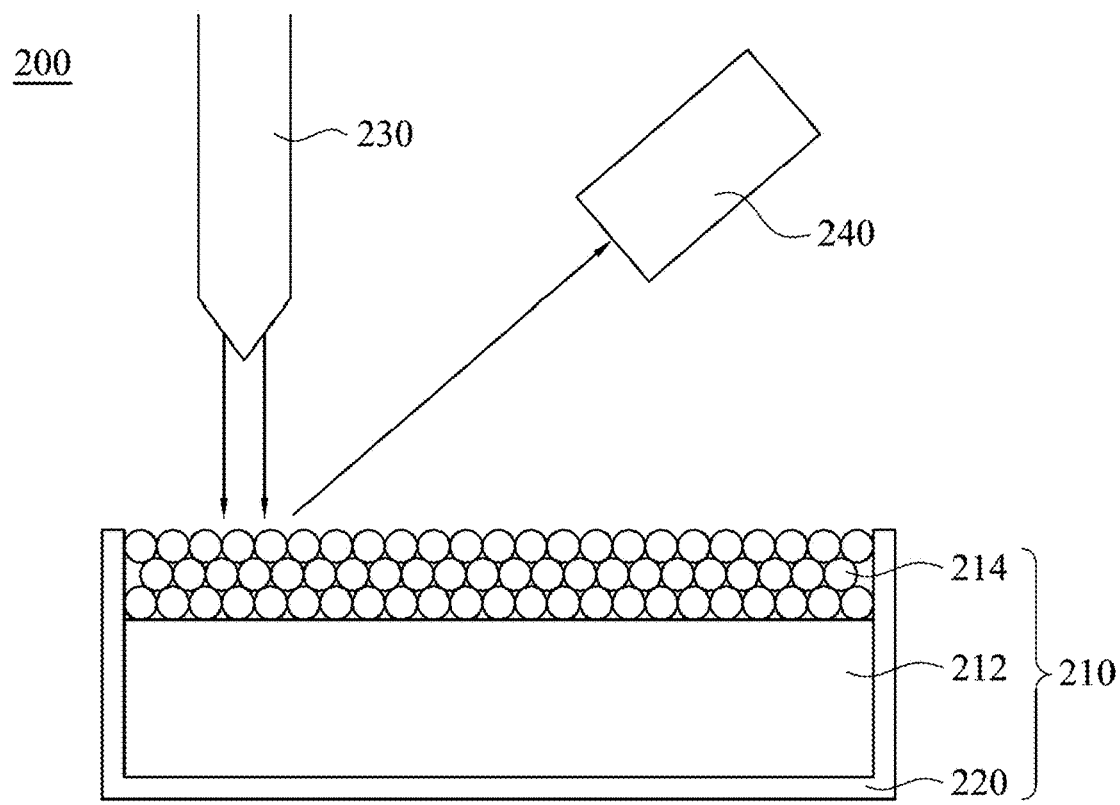
FIG. 2 shows a device of selective laser melting process according to some embodiments of the present invention.

Referring to FIGS. 1A-1D and FIG. 2, in which FIGS. 1A-1D show a flow chart of a method of performing a selective laser melting process, and FIG. 2 shows a device of selective laser melting process according to some embodiments of the present invention. First, referring to FIG. 1A, operation 110 is performed to provide a powder bed. In an embodiment, as shown in FIG. 2, the device 200 includes a powder bed 210, a container 220 and a laser beam 230. The powder bed 210 includes a substrate 212 and a powder layer 214 deposited on the substrate 212. The powder layer 214 is containing powders, which contain metal, polymer material and/or ceramic material. In an embodiment, material of the powder layer 214 is the same as or different from materials of the substrate 212. In an example, material of the powder bed 210 can be stainless steel, titanium alloy, cobalt-chromium alloy, aluminum, ceramics, thermoplastic polymer, and etc.

Subsequently, operation 120 is performed to obtain a group of information of the powder bed. In an embodiment, the group of information of the powder bed 210 includes a powder size distribution, material properties of the powders, dimension of the container, and shape of the powders. In an example, the material properties of the powders include melting point, boiling point, specific heat, thermal conductivity, and density. In an example, the shape of the powders can be irregular shape, spherical shape or combination thereof.

Then, operation 130 is performed to perform a powder bed simulation. In an embodiment, the powder bed simulation is performed by using the group of information of the powder bed to obtain a thickness of the powder bed, thermal conductivity, an average coordination number of the powders, and a packing density corresponding to different thickness of the powder layer. In an example, the powder bed simulation is performed by using MATLAB (Matrix Laboratory).

In some embodiments, the powder bed simulation is performed according to a sequential addition model. In an example of the sequential addition model of the present invention, the deposition of the powder layer is assumed to be in a slow process. In other words, the powder particles are dropped one-by-one from the top of the container, and the other particle is released only when the previous one has attained a stable condition. However, the stable condition is determined based on the areas of triangles, which is formed by four projection points of the incoming particles. In other words, the deposition process for each incoming particle terminates when the particle satisfies one of the following conditions: the particle reaches the bottom of the container; the particle rests against one of the container walls and two other deposited particles; the particle rests against two of the container walls and a single previously deposited particle. The simulation is continued until the powder layer reaches the top of the container.

The powder bed simulation is performed for several times to evaluate the impact of randomness. Subsequently, the packing density (p) is calculated by using equation (1), $$p = \frac{\sum_{i=1}^{N} V_i}{V_c} \quad (1)$$

where $V_i$ represents volume of each powder particle and $V_c$ represents volume of the container. In an embodiment, the packing density of the powder bed is higher than a predetermined packing density value. In an example, the predetermined packing density value is 0.5. In an example, the powder layers with thickness ranging from 10-30 μm have a packing density of less than 0.5; while the powder layers is thicker (i.e. 40-70 μm), the packing density is greater than 0.5.

Moreover, the coordination number is the number of contact points formed by one particle with its surrounded particles. The average coordination number of the powder particles is defined as the summation of the coordination number of all particles divided by the total number of the powder particles. Then, the effective thermal conductivity ($\lambda_e$) can be computed by equation (2), $$\frac{\lambda_e}{\lambda_s} = \frac{pn}{\pi} x \quad (2)$$

Where $\lambda_s$ is thermal conductivity of the corresponding bulk material, p is the packing density, n is the average coordination number, and x is the contact size ratio, wherein the contact size ratio is a ratio of the contact spot radius to a sphere radius.

Subsequently, operation 140 is performed to obtain a group of parameters of a laser. In some embodiments, the group of parameters of the laser includes a laser type, and values of a laser power, a scanning speed, and a laser spot size. In an example, the laser type is Nd:YAG laser. In an example, range of the laser power is 50-400 W, and range of the scanning speed is 100-2000 mm/s. In an example, D4σ of the laser spot size is 120 μm.

Figure 3:
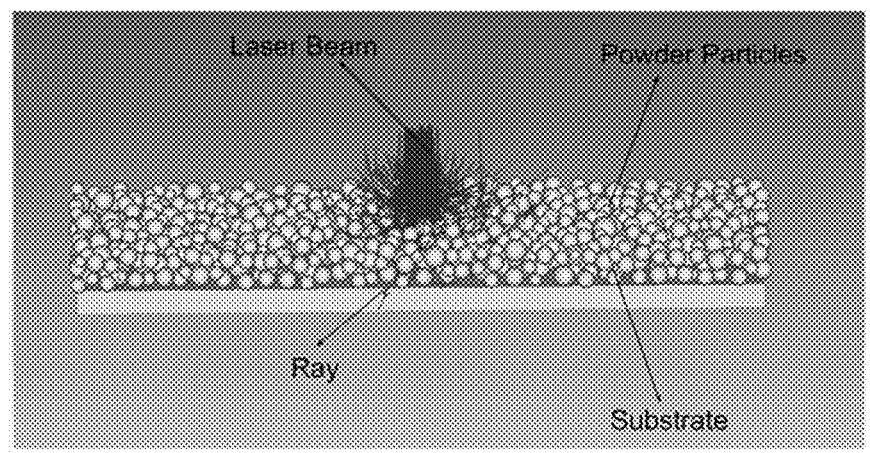
FIG. 3 shows a snapshot of the ray-tracing simulation process for a powder bed according to an embodiment of the present invention.
Figure 4A:
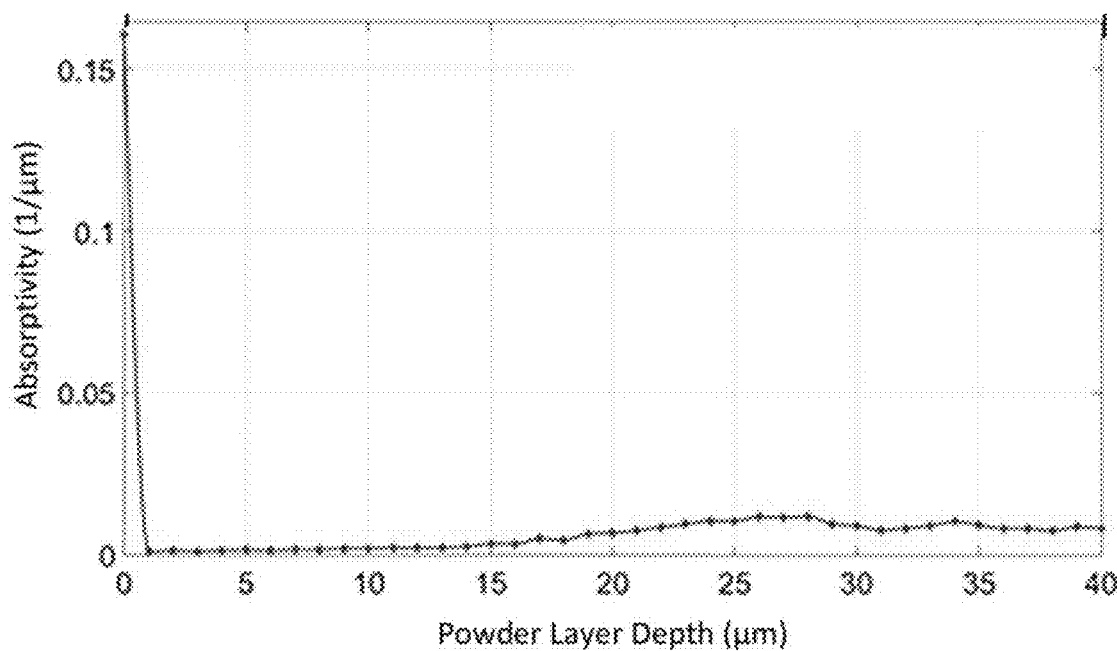
FIGS. 4A-4D illustrate the absorptivity profiles of the powder layers with different thickness according to an embodiment of the present invention.
Figure 4B:
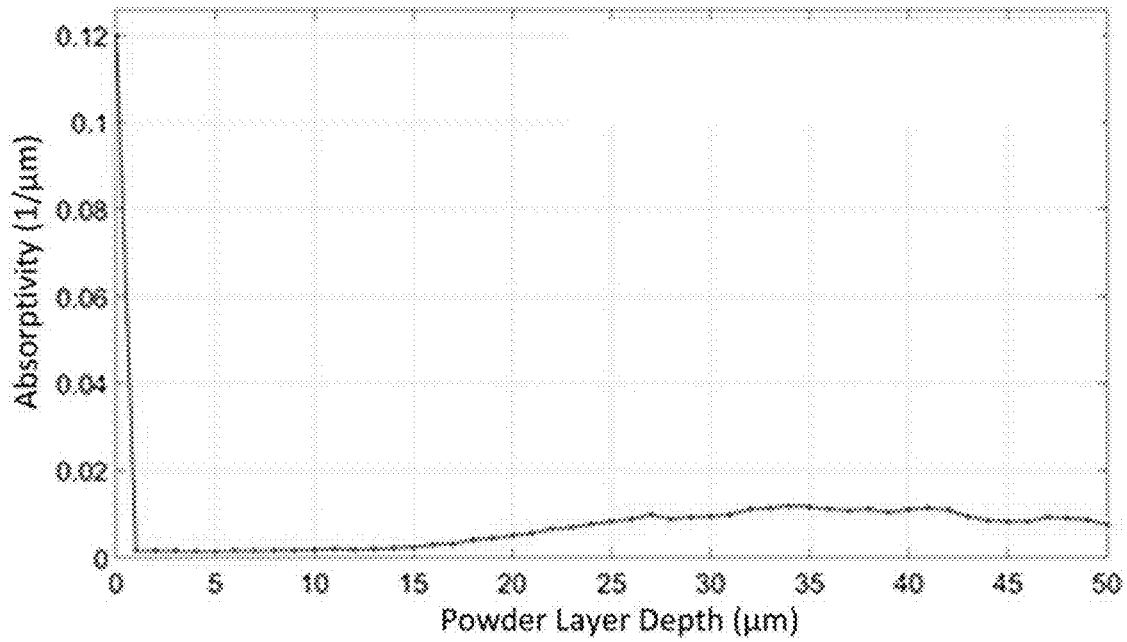
Figure 4C:
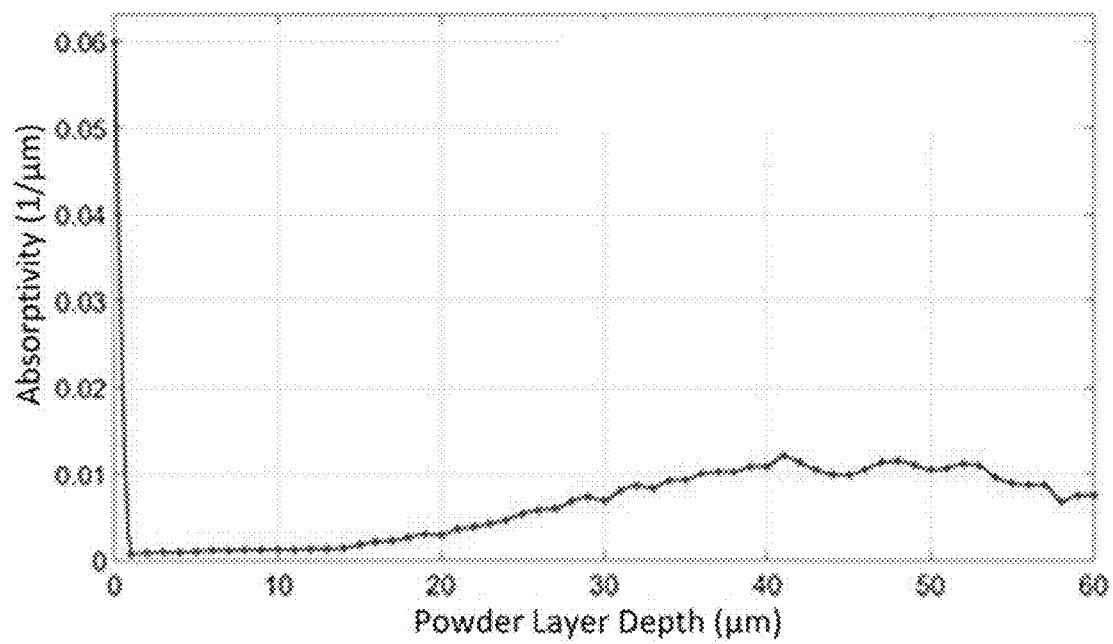
Figure 4D:
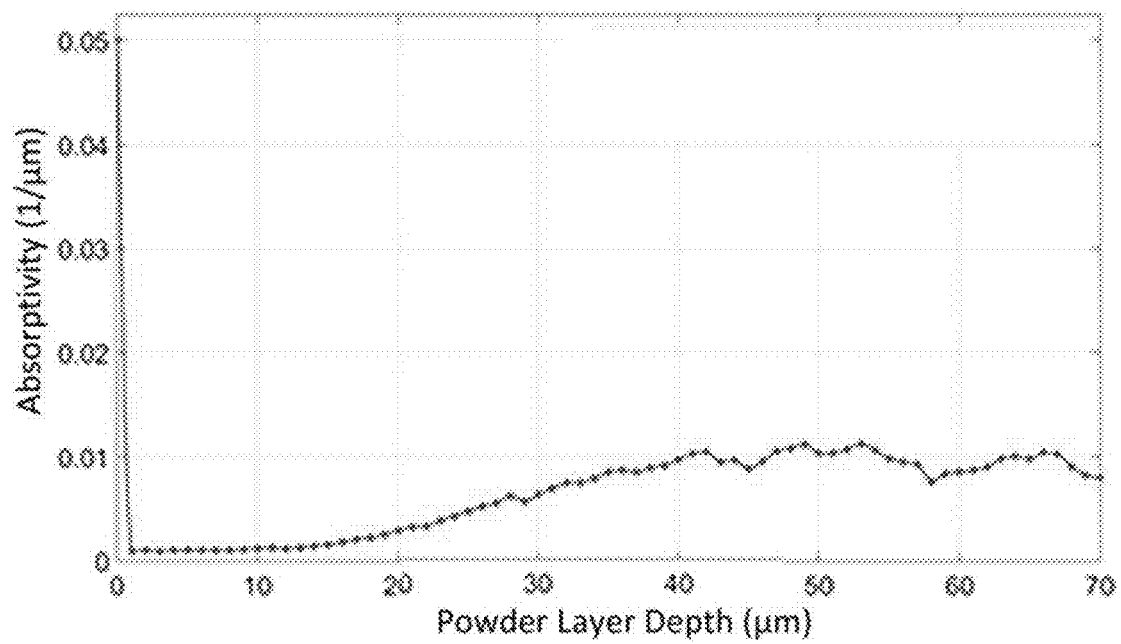

Then, in operation 150, a Ray Tracing simulation is performed for the powder layer to obtain an absorptivity profile along a depth of the powder layer. In some embodiments, operation 150 is performed by using the material properties of the powders, the group of parameters of the laser obtained in the operation 140, and the thickness of the powder bed. In some embodiments, the group of parameters of the laser used in the operation 150 includes the laser spot size and the laser type. In some embodiments, the absorptivity of the substrate is not 0. In some embodiments, Ray Tracing simulation is Monte Carlo ray-tracing simulation. In some embodiments, operation 150 is performed by using Zemax, which is a commonly used optical design program for designing and analyzing imaging system. As shown in FIG. 3, FIG. 3 shows a snapshot of the ray-tracing simulation process for a powder bed according to an embodiment of the present invention.

It is known for person having ordinary skill in the art that the energy density of a Gaussian laser beam can be written as equation (3), $$q(r) = \frac{2P}{\pi r_0^2} \exp\left(\frac{-2r^2}{r_0^2}\right) \quad (3)$$

where P is the laser power, $r_0$ is the radius of the laser beam at which the laser energy diminishes to $1/e^2$, and r is the radial distance from a point on the powder bed surface to the center of the laser spot. If the laser beam scans the powder bed surface with a constant speed v for time t, the above equation (3) is formulated in (x,y) coordinate form as equation (4)

$$q(x, y, t) = \frac{2P}{\pi r_0^2} \exp\left[-\frac{2[(x-vt)^2 + y^2]}{r_0^2}\right]. \quad (4)$$

However, as the laser beam irradiates the powder layer, part of the incident energy is absorbed and propagates through the depth of the powder bed. As the laser beam passes through the powder bed, the laser energy is dissipated through two mechanisms, namely absorption and scattering. In the absorption mechanism, the laser energy is absorbed by both the powder particles and the substrate, while in the scattering mechanism, the remaining energy is scattered from the powder bed. Therefore, the volumetric heat generation equation is formulated as equation (5), $$q(x, y, z, t) = \frac{2P}{\pi r_0^2} \exp\left[-\frac{2[(x-vt)^2 + y^2]}{r_0^2}\right] \frac{dA}{dz} \quad (5)$$

where dA/dz is the rate of change of the absorptivity profile along the depth direction of the powder layer.

As shown in FIGS. 4A-4D, FIGS. 4A-4D show the absorptivity profiles of the powder layers with different thickness, which is 40 μm, 50 μm, 60 μm and 70 μm, respectively, according to an embodiment of the present invention. It is noted that the origin of the x-axis is located on the upper surface of the substrate, while the maximum value of the x-axis corresponds to the upper surface of the powder bed in FIGS. 4A-4D. However, according to FIGS. 4A-4D, as the powder layer thickness increases from 40 μm to 70 μm, the absorptivity at the substrate reduces significantly (i.e. 40% for the thickness of 40 μm, 26% for the thickness of 50 μm, 13.3% for the thickness of 60 μm, and just 10% for the thickness of 70 μm).

Subsequently, in operation 160, a heat transfer simulation is performed to obtain a peak temperature and a dimension of a melt pool, in which the peak temperature is the greatest temperature of the melt pool. In some embodiments, operation 160 is performed by using the group of parameters of the laser, a temperature of the substrate, the thickness of the powder layer, and the absorptivity profile. In some embodiments, the heat transfer simulation is a finite element (FE) heat transfer simulation. In an example, the heat transfer simulation is performed in COMSOL Multiphysics and Matlab, where COMSOL Multiphysics is a cross-platform finite element analysis, solver and Multiphysics simulation software. In an embodiment, in each simulation time step, the heat transfer within the powder layer and the substrate was calculated using COMSOL Multiphysics software, and then nodal points with a temperature higher than the melting point of the powder material can be identified. Therefore, the material properties of regions covering the above nodal points can be changed, and the melted particles adhered to the substrate and formed part of the final bulk material after solidification. In the following time step, the initial condition according to the previous step and the material properties of the powder region and solidified region are updated in COMSOL. In an embodiment, the procedure of identifying melting region, updating material properties, setting up the initial condition is implemented by using Matlab. In an embodiment, the governing equation for the conductive heat transfer process is shown as equation (6), $$\rho c \frac{dT}{dt} q(x, y, z, t) + \frac{d}{dx}\left(k\frac{dT}{dx}\right) + \frac{d}{dy}\left(k\frac{dT}{dy}\right) + \frac{d}{dz}\left(k\frac{dT}{dz}\right) \qquad (6)$$

where ρ represents material density, c represents specific heat, T represents temperature, t represents interaction time, k represents thermal conductivity, and q(x,y,z,t) represents heat generation. In an example, the powder layer and the substrate are assumed to have an initial temperature of 300K, which is room temperature.

Figure 5A:
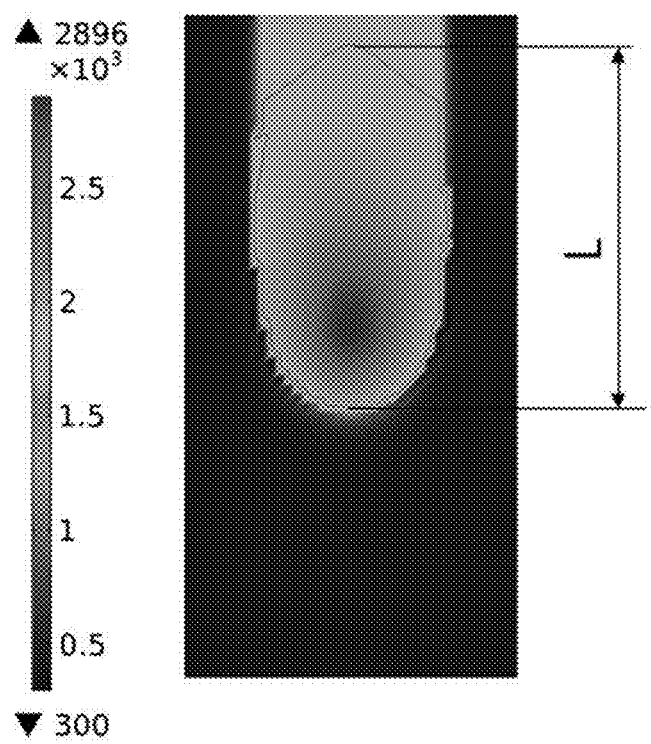
FIG. 5A shows a temperature distribution on the upper surface of the powder layer obtained by FE heat transfer simulation according to an embodiment of the present invention.
Figure 5B:
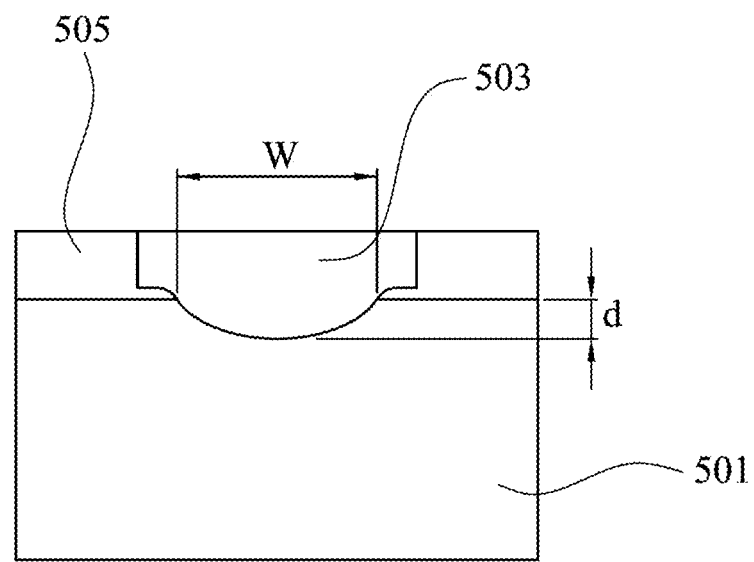
FIG. 5B is a cross-sectional view of the substrate and the powder layer, including the melt pool and a region with the temperature lower than melting point of the powder obtained by FE heat transfer simulation according to an embodiment of the present invention.

Referring to FIGS. 5A and 5B, FIG. 5A shows a temperature distribution on the upper surface of the powder layer obtained by FE heat transfer simulation according to an embodiment of the present invention, and FIG. 5B shows a cross-section view of the substrate 501 and the powder layer, including the melt pool 503 and a region 505 with the temperature lower than melting point of the powder obtained by FE heat transfer simulation according to an embodiment of the present invention. Otherwise, a length L of the melt pool 503, a contact width W between the melt pool 503 and the substrate 501, a depth d of the melt pool 503, and a peak temperature can be obtained.

Figure 6A:
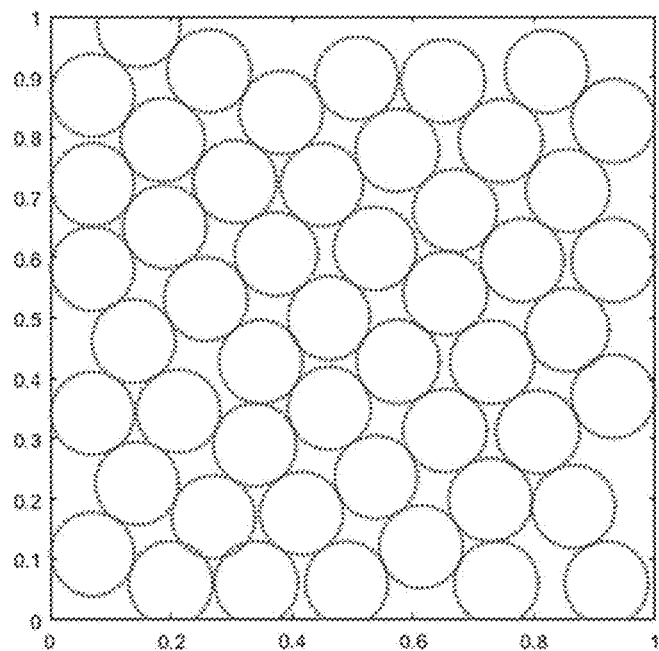
FIG. 6A shows a circle packing design algorithm according to an embodiment of the present invention.
Figure 6B:
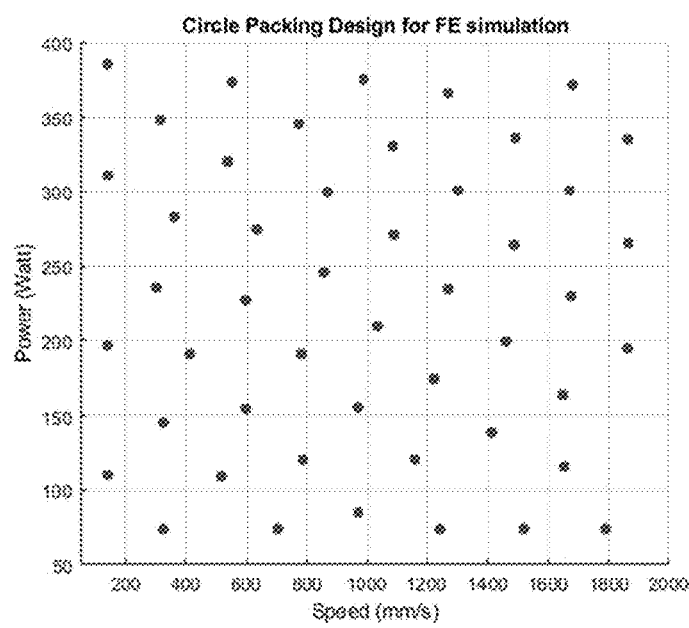
FIG. 6B shows the coordinates of each circle in FIG. 6A corresponding to parameters combination according to an embodiment of the present invention.

The location and number of combinations of laser power and scanning speed chosen in a design space have a significant impact on the predictability of a surrogate model. In the present invention, the parameters are identified using circle packing design algorithm. Referring to FIGS. 6A and 6B, FIG. 6A shows a circle packing design algorithm, and FIG. 6B shows the coordinates of each circle in FIG. 6A corresponding to parameters combination according to an embodiment of the present invention. One having ordinary skill in the art should know that the circle packing design is configurations of circles with specified patterns of tangency. A circle packing is an optimized arrangement of several arbitrary sized circles inside a container such that no circles overlap. As shown in FIG. 6A, the x- and y-axes are corresponding to scanning speeds of 100 to 2000 mm/s and laser powers of 50 to 400 W, respectively. In some embodiments, the circle packing design algorithm implemented in the present invention is a self-written code. To ensure an adequate distribution and number of sample points, as shown in FIG. 6A, the radius of each circle was set as 0.075. According to FIG. 6A, the coordinates of each circle are converted into several points corresponding to combination values of the scanning speed and the laser power, as shown in FIG. 6B. For each sampling point, the operation 160 is performed to determine the corresponding dimensions of the melt pool and the peak temperature.

In order to understand effects of the laser power and scanning speed on the information of the melt pool, the operation 160 should be run repeatedly. However, since the heat transfer simulation is time-consuming, a surrogate model is employed to predict large number of depth of the melt pool from a small number of heat transfer simulation results.

Figure 7:
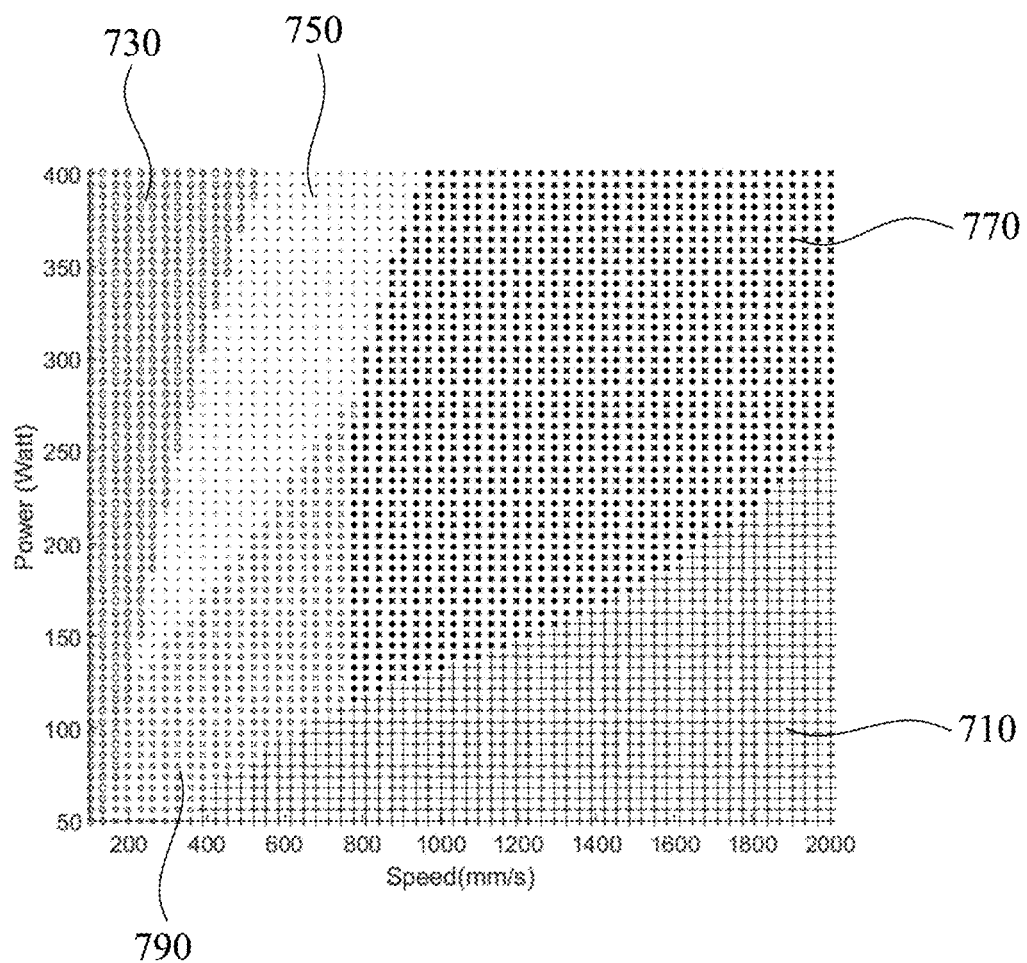
FIG. 7 shows a first processing map of the depth of the melt pool for a powder layer thickness of 40 micrometer according to an embodiment of the present invention.

Therefore, operation 170 is performed to construct a first surrogate model to obtain first processing maps for different thickness of the powder layer. In an embodiment, operation 170 is performed by using the finite element simulation results of operation 160, which include the peak temperature and the dimension of the melt pool, to train artificial neural networks (ANNs). In an embodiment, there are several points in the first processing maps, where each point corresponding to a combination of the scanning speed and the laser power, as shown in FIG. 7, which shows a first processing map of the depth of the melt pool for a powder layer thickness of 40 micrometer according to an embodiment of the present invention.

Figure 8:
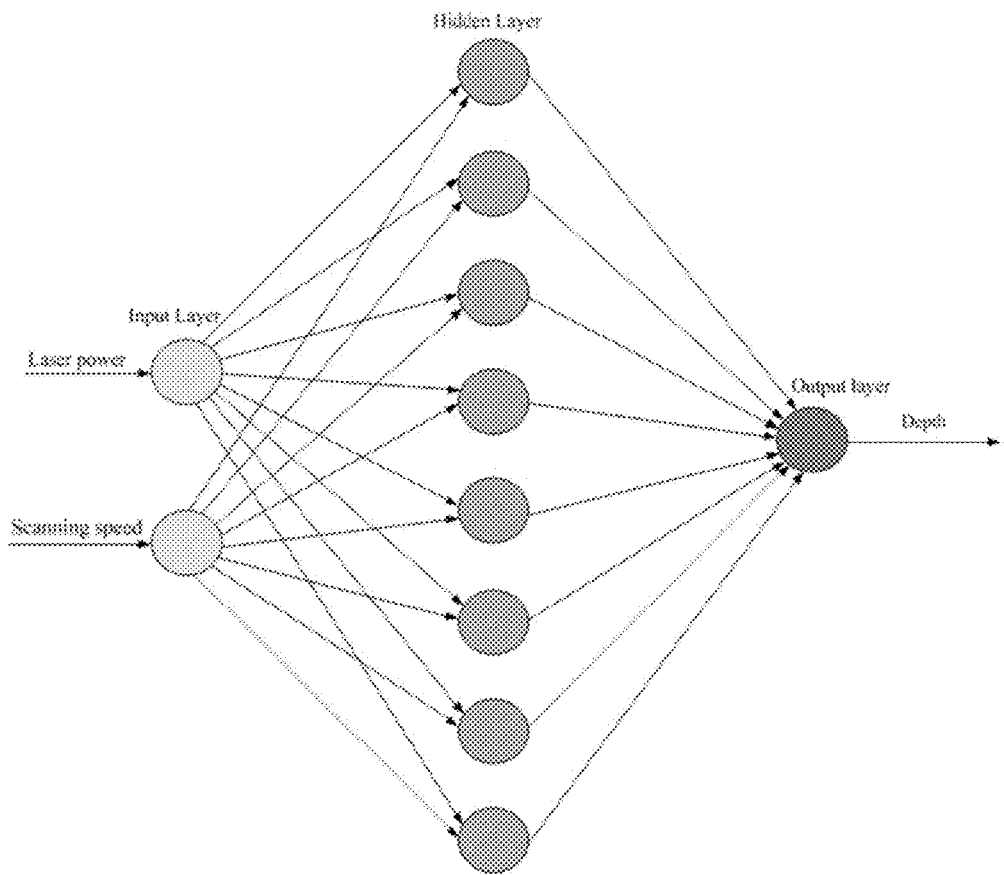
FIG. 8 shows a typical topology of the ANN used to predict the depth of the melt pool given values of the laser power and the scanning speed according to an embodiment of the present invention.

Subsequently, following "A" step in FIG. 1A to FIG. 1B, operation 175 is performed to calculate a depth of the melt pool of each point in the first processing maps. By using the ANNs trained in operation 170, a depth of the melt pool with a combination of the scanning speed and the laser power can be obtained. In addition, a large number of data for the dimensions of the melt pool and peak temperature can also be obtained. Referring to FIG. 8, FIG. 8 shows a typical topology of the ANN used to predict the depth of the melt pool given values of the laser power and the scanning speed according to an embodiment of the present invention. It is understood that the contact-width between the melt pool and the substrate, the length and the peak temperature of the melt pool can be predicted by the similar ANNs. In an embodiment, the ANNs are implemented by using a neural net package in R programming software with a sigmoid activation function and a backpropagation training algorithm.

In order to ensure the quality of the SLM product, the combination of the laser power and the scanning speed are important parameters to enhance the adhesion between the melt pool and the substrate. Therefore, the depth of the melt pool obtained with the specific combination of the laser power and the scanning speed is a key indication. Therefore, operation 180 is performed, determining whether the depth of the melt pool of each point is greater than a predetermined depth value. In some embodiments, the predetermined depth value is 15 μm. In some embodiments, when the depths of the melt pool of the points are smaller than the predetermined depth value, the arrow with "No" is followed, and the points, which are in region 710 of FIG. 7 in some embodiments, are not applicable for the SLM process. That is, the combination of the scanning speed and the laser power cannot result in an adequate adhesion of the melt pool to the substrate.

In other embodiments, when the depth of the melt pool of the points are greater than the predetermined value, the arrow with "Yes" is followed, and then operation 182 is performed to determine whether the depths of the melt pool of the points are smaller than a laser beam radius. In some embodiments, the laser beam radius is 60 μm. In some embodiments, when the depths of the melt pool of the points are greater than a laser beam radius, the arrow with "No" is followed, and the points, which are in region 730 of FIG. 7 in some embodiments, are not applicable for the SLM process. That is, the combination of the scanning speed and the laser power result in key-hole melting of the melt pool, which make the SLM products contain voids, and thus have low density. In other embodiments, when the depths of the melt pool of the points are smaller than a laser beam radius, the arrow with "Yes" is followed, and the points are defined as a first group of parameter values, which are in regions 750, 770 and 790 of FIG. 7 in some embodiments.

The first group of parameter values in the first processing maps corresponds to a processing condition, which can both avoid the key-hole melting effect and the melt pool adhesion. Therefore, the first group of parameter values in the first processing maps is more suitable to implement in the SLM process than the other parameter values.

In some embodiments, following "B" step in FIG. 1B to FIG. 1C, operation 184 is then performed, determining whether a ratio of the first group of parameter values to all points of the first processing maps is greater than a predetermined ratio. In some embodiments, when the ratio is smaller than the predetermined ratio, the arrow with "No" is followed, and then operation 184A is performed to re-adjust the thickness of the power bed. Following the operation 184A, "C" step is followed to go back to the operation 175. In some embodiments, when the ratio is greater than the predetermined ratio, the arrow with "Yes" is followed, and then operation 184B is performed, using the thickness of the powder bed to calculate a built-plate drop down distance.

It is understood that when a powder layer of a given thickness is melted, its height reduces due to the elimination of the voids between the powder particles. Subsequently, the next deposited powder layer is deeper than the amount by which the build-plate drops between successive layers. As the SLM process proceeds, the thickness of the powder layer keep increasing until it reaches a steady state, in which the thickness of the steady state ($t_{steady}$) can be calculated by equation (7), $$t_{steady} = \frac{t_{machine}}{1 - v_f} = \frac{t_{machine}}{p} \qquad (7)$$

Where $t_{machine}$ represents the distance by which the build-plate drops between each layer; $v_f$ represents the void fraction of the powder bed; and p represents the packing density.

Figure 9:
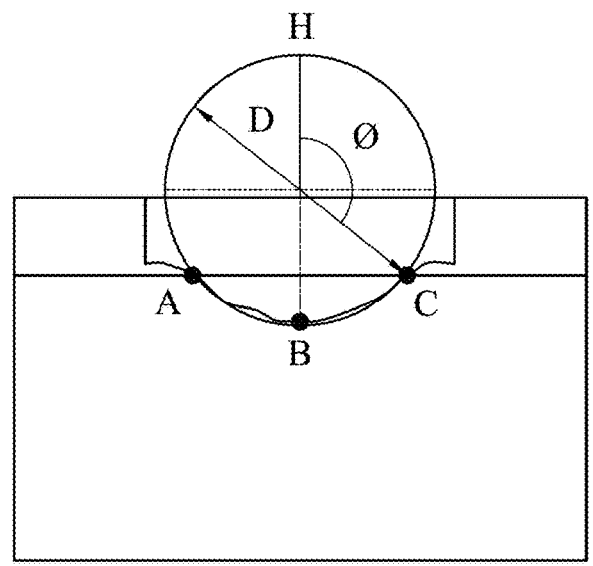
FIG. 9 shows the melt pool profile according to an embodiment of the present invention.

Then, in some embodiments, operation 186 is performed to calculate a ratio of a diameter to the length of the melt pool. Afterwards, following "D" step from FIG. 1C to FIG. 1D, operation 188 is performed to determine whether the points of the first group of parameter values satisfy a stability criterion algorithm, which is used to judge stability of the melt pool. The stability criterion algorithm is shown as equation (8), $$\frac{D}{L} > \frac{\sqrt{2}}{\pi} \sqrt{\frac{\varphi(1 + \cos2\varphi) - \sin2\varphi}{2\varphi(2 + \cos2\varphi) - 3\sin2\varphi}} \qquad (8)$$

where D represents a diameter of the segmental cylinder; L represents the length of the melt pool; and φ represents an angle. By using the surrogate model, the length of the melt pool (L), the contact-width between the melt pool and the substrate (W), and the depth of the melt pool (d) corresponding to each combination of the laser power and the scanning speed of the first group of parameter values can be predicted. FIG. 9 shows the melt pool profile according to an embodiment of the present invention. As shown in FIG. 9, points A, B, and C are constructed by using the value of the contact-width (W) and the depth (d), and a circle passing through points A, B, and C is constructed to determine the diameter (D) of the segmental cylinder and the angle (φ) accordingly.

In some embodiments, when the points in the first group of parameter values do not satisfy the stability criterion algorithm, the arrow with "No" is followed, and the points are removed from the first group of parameter values. The reason for removal is that with the above points, which are in region 770 of FIG. 7 in some embodiments, the combination of the laser power and the scanning speed result in an unstable single scan track. In other embodiments, when the points in the first group of parameter values satisfy the stability criterion algorithm, the arrow with "Yes" is followed, and then operation 190 is performed to determine whether the peak temperature of the points is lower than a predetermined temperature. In an embodiment, the predetermined temperature is an evaporation point of the powders. In some embodiments, when the peak temperature is higher than the predetermined temperature, the arrow with "No" is followed, and the points, which are in region 750 of FIG. 7 in some embodiments, are removed from the first group of parameter values. In other embodiments, when the peak temperature is lower than the predetermined temperature, the arrow with "Yes" is followed, and operation 196 is performed to perform a parameter setting operation by setting the points as the first group of parameter values, which are in region 790 of FIG. 7 in some embodiments. Since high energy density is inputted in the SLM process, it results in boiling and vaporization of a large amount of molten powders, and thus produces a large vapor recoil pressure, which causes a distortion of the single scan track. Also, the vaporization of the low-melting-point constituents within the alloy causes the formation of gas bubbles in the melt pool, thereby spattering and ejection of droplets from the melt pool can occur. However, the distortion of the single scan track is further worsened. Accordingly, the above points not belong to the first group of parameter values are better not used in the SLM process. Furthermore, the first group of parameter values in the first processing maps used in the SLM process can avoid the key-hole melting effect, ensure good adhesion between the melt pool and the substrate, produce a stable scan track, have good stability, and suffer minimal distortion, thus the first group of parameter values is more feasible for the SLM process.

Since in the SLM process, the temperature of the solidified layer beneath the powder bed increases due to heat accumulation effect. It is understood that the solidified layer is the powder layer melted by the laser and then solidified. Thus, after obtaining the built-plate drop down distance, the operations 170 to 192 are repeated for different temperatures in some embodiments. In these embodiments, the initial temperature of the substrate in heat transfer simulation is a room temperature, and the temperature is increasing by 100 K each time. The above operations stop when there are no points for the first group of parameter values in the first processing maps. Therefore, there are several first processing maps corresponding to different temperatures, which can be used thereafter.

Figure 10:
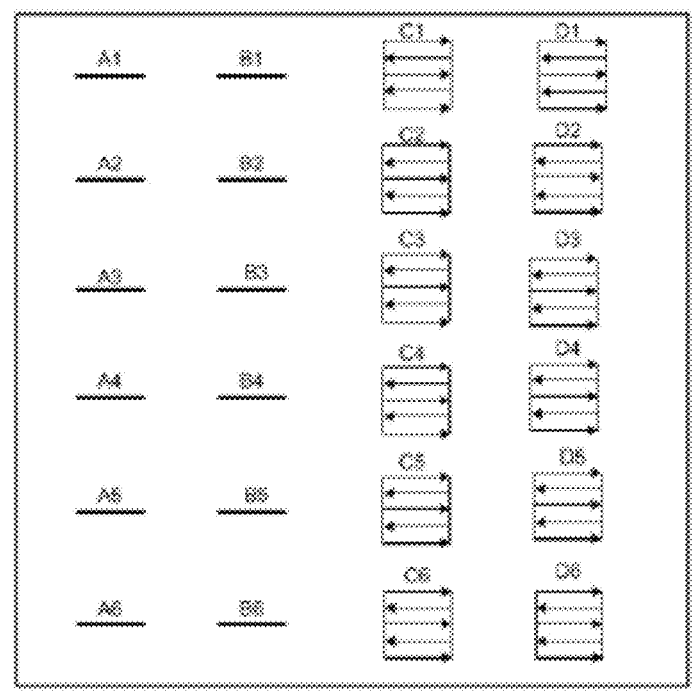
FIG. 10 shows a layout of the single scan track and surface scanning experiments according to an embodiment of the present invention.

In some embodiments, a single scan track is performed on workpieces by using the first group of parameter values, and speckle images are obtained by a digital camera. In some embodiments, the single scan track is only performed on a first layer of the workpieces. Referring to FIG. 10, which shows layout of the single scan track (A1-A6 and B1-B6) and surface scanning experiments (C1-C6 and D1-D6) according to an embodiment of the present invention. The speckle images of the workpieces are used to measure surface roughness. In some embodiment, the surface roughness is measured by using a Scan Laser Pico Projection (SLPP) method. Moreover, the speckle images can be used to analyze contrast features by using Gray-Level Co-Occurrence Matrix (GLCM) method. It is understood that rougher surfaces scatter more light than smooth surface, therefore, the higher the contrast of the speckle images is, the rougher the surface is. In general, according to some embodiments, higher scanning speed is beneficial in reducing the surface roughness of the scan tracks, and lower surface roughness improves the density of the SLM products. Accordingly, the first group of parameter values can be divided into two subgroups according to the scanning speed values. The surface roughness of the workpieces fabricated by using the two subgroups are compared respectively. In some embodiments, the workpiece with lower surface roughness is obtained by using one of the two subgroups with higher scanning speed. In other words, one of the two subgroups with higher scanning speed of the first group of parameter values is better to be used in the SLM process.

Figure 12:
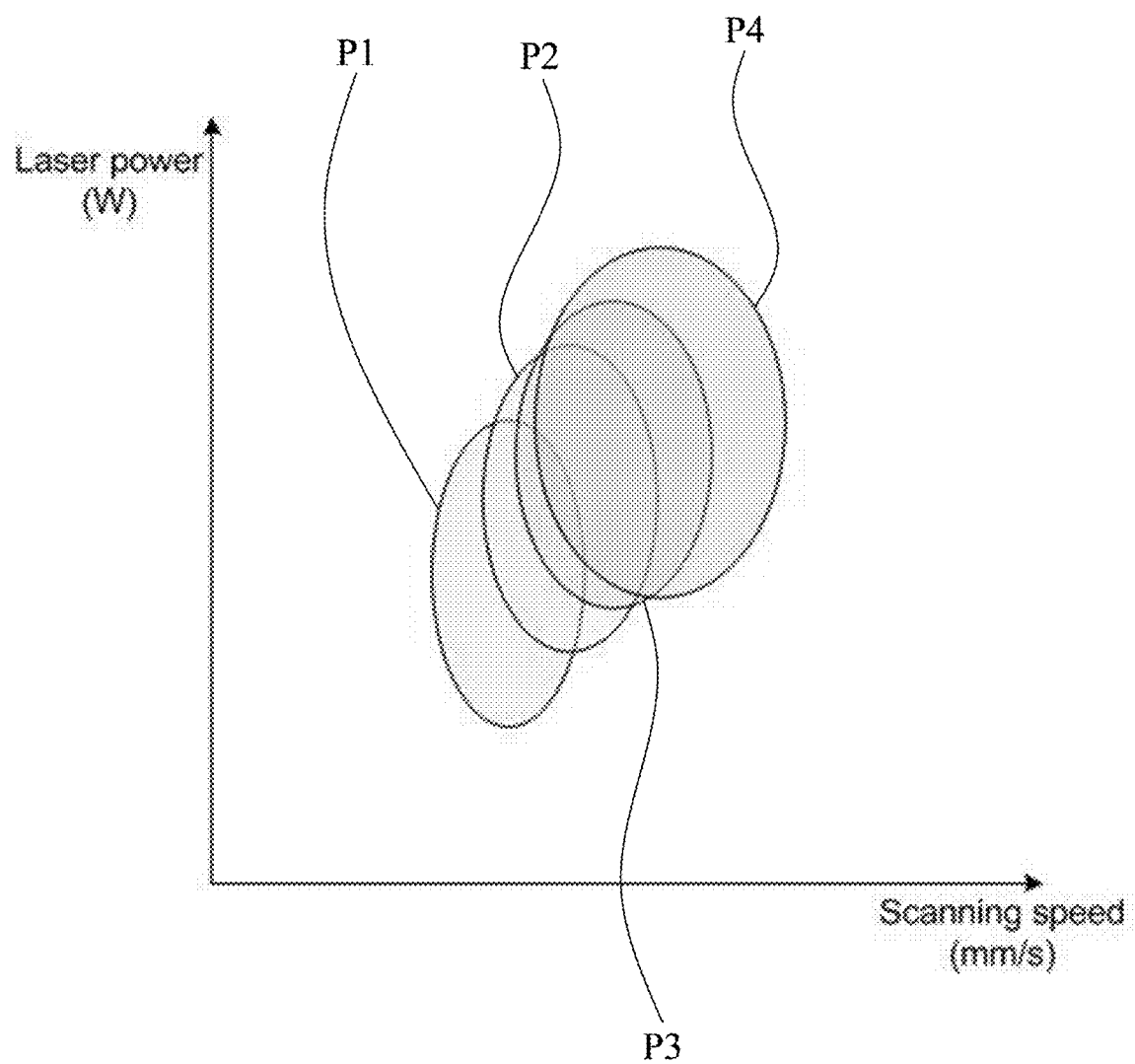
FIG. 12 shows a schematic diagram of applicable parameter values corresponding to different temperatures overlapping in a processing map according to an embodiment of the invention.

In some embodiments, before operation 196, operation 192 is selectively performed to obtain the first processing maps corresponding to different temperatures of the substrate used in the heat transfer simulation. In some embodiments, operation 192 includes performing several heat transfer simulation by using several temperatures of the substrate, and then constructing the first surrogate models to obtain the first processing maps corresponding to different temperatures of the substrate. In an embodiment, a range of the temperatures is between 293 K and 800 K. In other embodiment, a range of the temperatures is between 293 K and 600 K. Subsequently, in operation 194, the several first groups of parameter values in the first processing maps corresponding to different temperatures of the substrate used in the heat transfer simulation are overlapped with each other, and a second group of parameter values is obtained. Referring to FIG. 12, which shows a schematic diagram with of first group of parameter values corresponding to different temperatures overlapping in a processing map according to an embodiment of the invention. It is understood that four regions, which are P1, P2, P3, and P4, in the FIG. 12 represent the first groups of parameter values corresponding to different temperatures. For example, region P1 represents the first group of parameter values corresponding to 293K; region P2 represents the first group of parameter values corresponding to 400K; region P3 represents the first group of parameter values corresponding to 500K; region P4 represents the first group of parameter values corresponding to 600K. Moreover, the overlapping region represents the second group of parameter values. Therefore, the second group of parameter values is applicable in the temperature range (for example, 293K to 600K).

Then, referring to FIG. 1D and FIG. 2, cycles of selective laser melting operation is performed on the workpiece. The cycle of selective laser melting operation includes operation 196 to operation 199. In operation 196, the parameter setting operation is performed by using the first and/or second group of parameter values. Subsequently, in operation 198, a laser melting operation is performed on the powder layer 214 of the workpiece. After one powder layer is scanned by the laser beam 230, a solidified layer is obtained. Then, operation 199 is performed to measure a temperature distribution on a top surface of the solidified layer of the workpiece by using a thermal infrared camera 240. It is understood that only when the temperature distribution of the solidified layer is within the range of temperatures used to obtain the second group of parameter values, the cycles of selective laser melting operation can be performed on the workpiece. If the temperature of the solidified layer is higher than the greatest temperature of the range of temperatures, in some embodiments, it takes time to wait for the workpiece to cool down until the temperature of the solidified layer is within the range of temperatures. In other embodiments, the cycles of selective laser melting operation are performed continuously, while the operation 198 (laser melting operation) is first performed on a region, in which the temperature is within the range of temperatures, thereby, other region with higher temperature can be cooled down until the temperature of the solidified layer is within the range of temperatures. Afterwards, the cycles of the operation 196 to 199 are repeated until the product is fabricated.

Figure 11A:
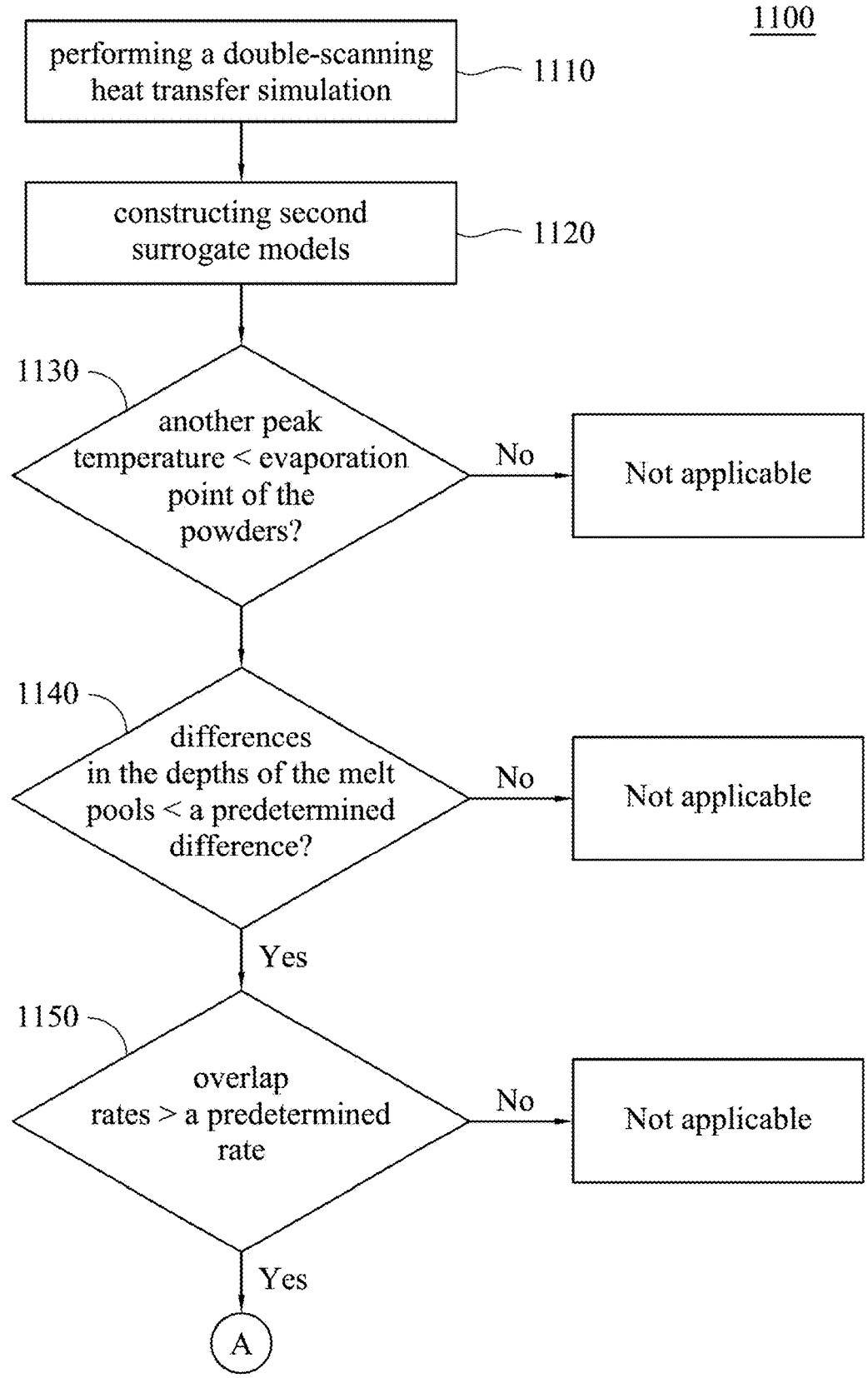
FIGS. 11A-11B show a flow chart of a method of performing a SLM process according to an embodiment of the present invention.
Figure 11B:
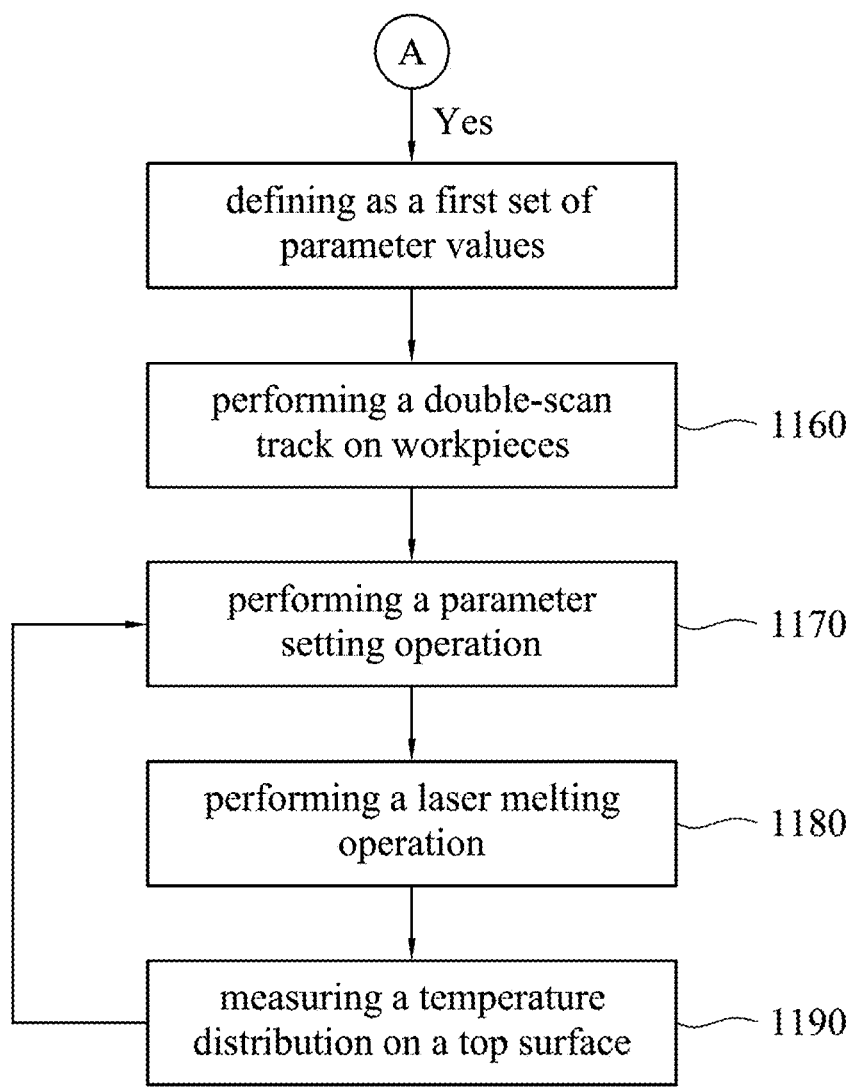

Referring to FIGS. 11A-11B, FIGS. 11A-11B show a flow chart of a method 1100 of performing a SLM process according to an embodiment of the present invention. In some embodiments, the method 1100 is selectively performed before, during, or after the method 100. For example, the method 1100 is based on the first or second group of parameter values obtained in the method 100.

Figure 13A:
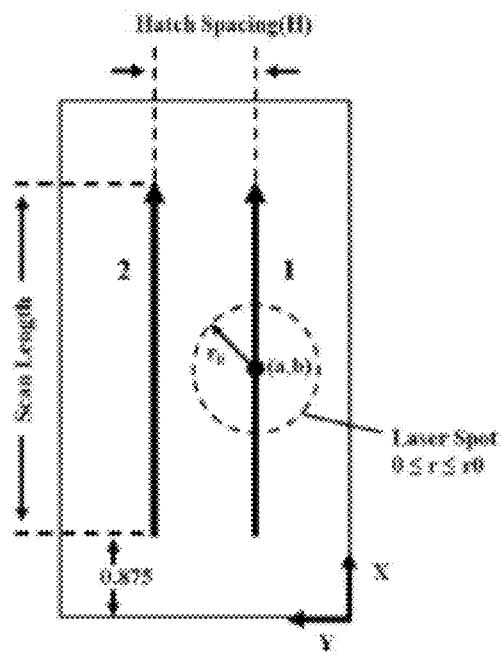
FIGS. 13A and 13B are schematic views of laser spot and scan track direction in different modes according to an embodiment of the present invention.
Figure 13B:
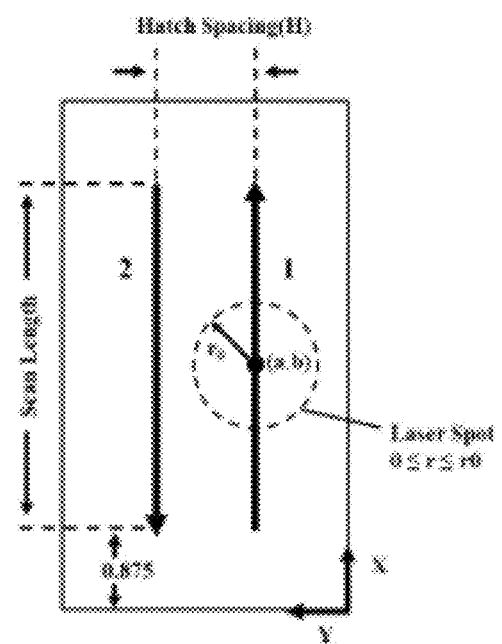

In an embodiment, after the operation 194 of the method 100, referring to FIG. 11A, in operation 1110, a double-scanning heat transfer simulation is performed by using the first or second group of parameter values obtained in the operation 194 of the method 100. In some embodiments, the heat transfer simulation is finite element heat transfer simulation. In an example, the double-scanning heat transfer simulation is performed by using COMSOL Multiphysics commercial software. In an embodiment, the double-scanning heat transfer simulation is performed in both uni-directional mode and bi-directional mode, as shown in FIGS. 13A and 13B, which show schematic illustrations of laser spot and scan track direction in different modes according to an embodiment of the present invention. In every scanning track simulation, the laser power and the scanning speed are assigned constant values. Similar to the operation 160 of the method 100, circle packing design algorithm is also used to determine combinations of the scanning length and the hatch space for the double-scanning heat transfer simulation. The operation 1110 is performed to determine another peak temperature and melt pool dimensions of the two scanning tracks for each combination of the scanning length and the hatch space.

Subsequently, operation 1120 is performed to construct second surrogate models to obtain second processing maps. In this embodiment, the operation 1120 is performed by using the results of the operation 1110 to train artificial neural networks. In an embodiment, the second processing maps include several points corresponding to combinations of scanning length and hatch space. The second surrogate models are constructed to predict another peak temperature, difference in the depth of the melt pool between adjacent tracks, and track overlap rate.

Then, operation 1130 is performed to determine whether the another peak temperature is lower than an evaporation point of the powders. In some embodiments, when the another peak temperature is higher than the evaporation point of the powders, the arrow with "No" is followed, and the points are not applicable. If the another peak temperature is higher than the evaporation point, it results in the formation of cavities, which cause the laser to penetrate even deeper into the powder bed. Thus, more energy is trapped within the melt pool and a keyhole effect is caused. Therefore, the resulting pores within the melt pool lower the density of the final product. Moreover, the powder spattering effect caused by the strong convection force within the keyhole region degrades surface quality of the product. In other embodiments, when the another peak temperature is lower than the evaporation point of the powders, the arrow with "Yes" is followed.

Figure 14:
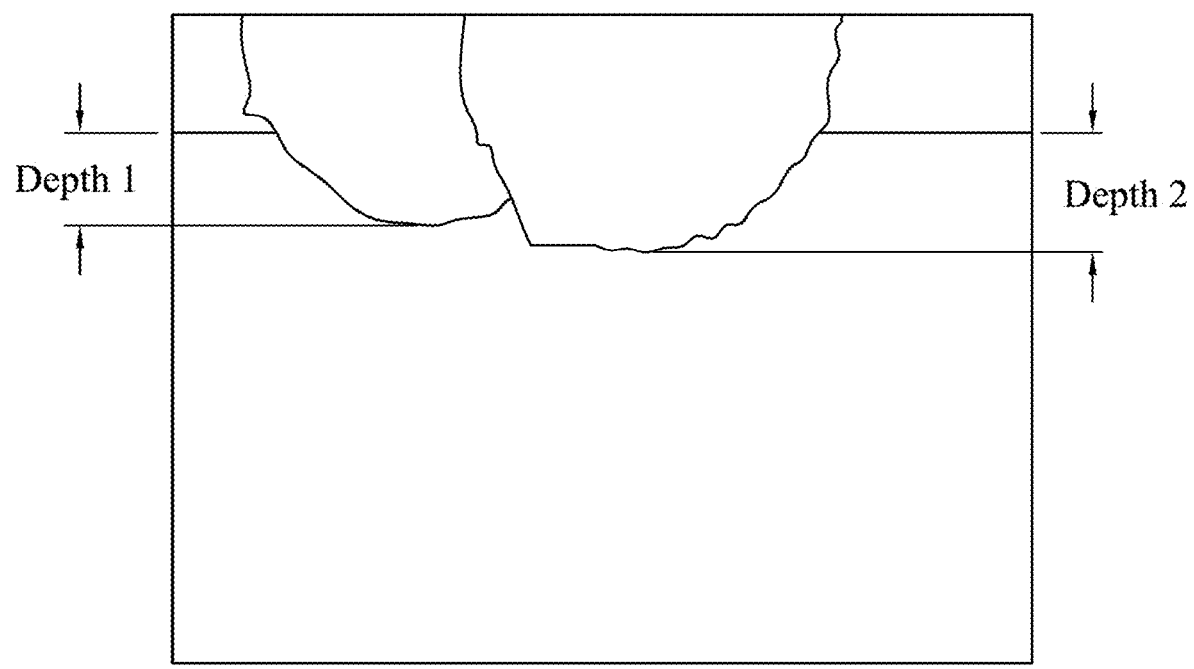
FIG. 14 is a cross-sectional view of the melt pools mid-point positions of adjacent scan tracks according to an embodiment of the present invention.

Subsequently, operation 1140 is performed to calculate depths of the melt pools and determining whether differences in the depths of the melt pools are lower than a predetermined difference. As shown in FIG. 14, FIG. 14 shows a cross-section view of the melt pools mid-point positions of adjacent scan tracks according to an embodiment of the present invention. In some embodiments, when the differences in depth are greater than the predetermined difference, the arrow with "No" is followed, and the points are not applicable. However, the SLM process involves multiple scanning passes. If the depth of the melt pool continues to grow in adjacent tracks, an inhomogeneity of the material properties occurs, thus, the structure of the workpiece is weakened. In other embodiments, when the differences in depth are lower than the predetermined difference, the arrow with "Yes" is followed to perform the following operations, which can be used to preserve homogeneity of the scanned powder bed material properties.

Figure 15A:
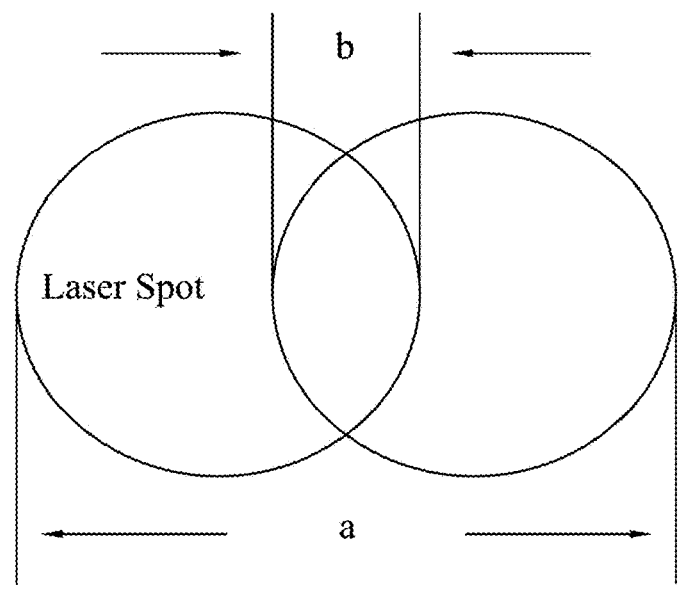
FIG. 15A is a schematic diagram showing an overlap region of the melt pools of the adjacent tracks according to an embodiment of the present invention.
Figure 15B:
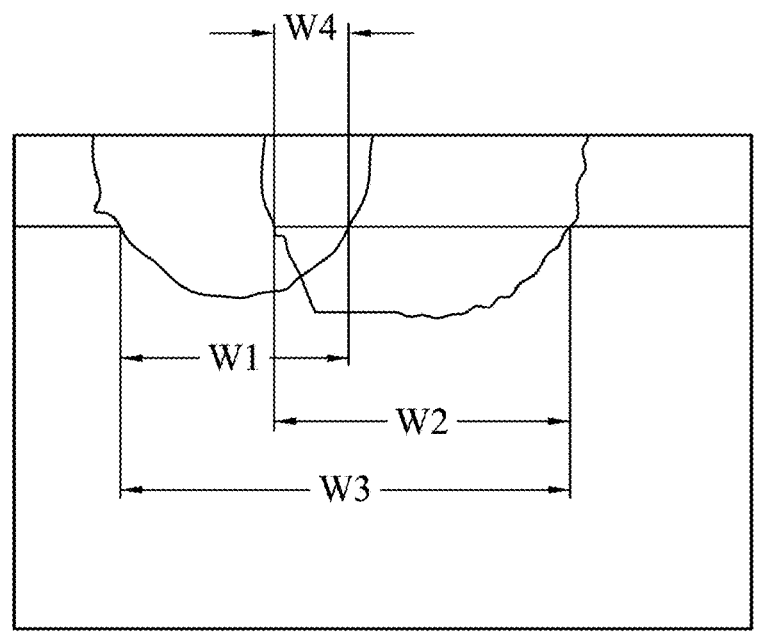
FIG. 15B is a cross-sectional view of overlapping melt pools at mid-point position of adjacent scan tracks according to an embodiment of the present invention.

Then, operation 1150 is performed to calculate overlap rates of the melt pools and to determine whether the overlap rates are greater than a predetermined rate. The degree of overlap is evaluated using the overlap rate, and it plays a key role in determining the mechanical properties of the final products. As shown in FIGS. 15A and 15B, FIG. 15A is a schematic diagram showing an overlap region of the melt pools of the adjacent tracks, and FIG. 15B shows a cross-section view of overlapping melt pools at mid-point position of adjacent scan tracks according to an embodiment of the present invention. The overlap rate can be defined by equation (9), $$\text{overlap rate}(\%) = \frac{b}{a} \times 100\% = \frac{W4}{W3} \times 100\% = \frac{W1 + W2 - W3}{W3} \times 100\% \quad (9)$$

where a and b are defined as FIG. 15A shown; while W1 and W2 represent widths of the melt pool in the first and second tracks, respectively; W3 represents total width of the two melt pools; W4 represents overlap of two melt pools. In some embodiments, when the overlap rates are lower than the predetermined rate, the arrow with "No" is followed, and the points are not applicable. Since small overlap rate results in an un-melted area between the adjacent tracks, which lowers density and yield stress of the final products. In other embodiments, when the overlap rates are greater than the predetermined rate, the arrow with "Yes" is followed, and the points are defined as a first set of parameter values. Moreover, the first set of parameter values is considered as the applicable combination of hatching space and scanning length.

Afterwards, following "A" step in FIG. 11A to FIG. 11B, in operation 1160, a double-scan track is performed on workpieces by using the first set of parameter values, and speckle images are obtained by a digital camera. In an embodiment, the second group of parameter values is used in the operation 1160. In some embodiments, the workpieces are scanned by using a scanned laser pico-projector. Similar to the method 100, the speckle images can be used to analyze contrast features by using the GLCM method.

Subsequently, the cycles of selective laser melting operation is performed on the workpiece. The cycle of selective laser melting operation includes operation 1170 to operation 1190. In operation 1170, a parameter setting operation is performed. In some embodiments, the first set of parameter values is used in the operation 1170. Then, performing operation 1180, the laser melting operation is performed on the powder layer of the workpiece. After one powder layer is scanned by the laser beam, a solidified layer is obtained. Afterwards, in operation 1190, measuring a temperature distribution on a top surface of the solidified layer of the workpiece by using the infrared camera. The parameters of combination of the scanning length and the hatch space used in the SLM process are adjusted by a controller according to the temperature distribution obtained for each solidified layer of the workpiece. Therefore, the cycles of the operation 1170 to 1190 are repeated until the product is fabricated.

Embodiments 1-8 and Comparative Examples 1-8

Following the method 110, 8 points of the second group parameter values are chosen and used to produce 3D SS 316L cubes with dimensions of 10 mm×10 mm×5 mm. Table 1 shows the information of the powder bed and parameters of the laser. The cubes of embodiments 1-8 are fabricated by using the SLM system, and Table 2 shows the parameter setting for each embodiment. For each embodiment, there are 5 cubes fabricated. Additionally, bi-directional scanning strategy is employed and rotation angles between layers are set as 90°. The experiments are performed in a chamber filled with $N_2$, and concentration of $O_2$ is controlled under 2000 ppm for avoiding oxidation of the metal powder.

TABLE 1

| Powder material | Stainless Steel 316L (SS 316L) |
|---|---|
| Powder size distribution | $d_{10}$ = 22.94 μm; $d_{50}$ = 38.52 μm; $d_{90}$ = 56.88 μm |
| Range of laser power (P) | 50-400 W |
| Range of scanning speed (v) | 100-2000 mm/s |
| Laser spot size | D4sigma = 120 μm |
| Laser type | Nd: YAG laser |

TABLE 2

| Embodiment | 1 | 2 | 3 | 4 | 5 | 6 | 7 | 8 |
|---|---|---|---|---|---|---|---|---|
| Laser Power (W) | 160 | 160 | 180 | 180 | 200 | 200 | 230 | 230 |
| Scanning speed (mm/s) | 600 | 650 | 680 | 700 | 680 | 700 | 710 | 730 |
| Hatching space (μm) | 77 | 75 | 76 | 75 | 74.5 | 75 | 76 | 75 |
| Build-plate drop distance ($t_{machine}$) (μm) | 25 | 25 | 25 | 25 | 25 | 25 | 25 | 25 |

To evaluate relative density of the cubes of embodiments 1-8, each cube is sawed in half to obtain cross-section, and the cross-sections of the cubes are polished and photographed by a digital camera attached to a microscope. For each sample, images are captured at five different locations of the polished cross-sections. For each image, the relative densities of the cubes are evaluated by using Image J software as a ratio of total pore area to total cross-sectional area. Table 3 shows mean and standard deviation of the relative densities of the cubes of embodiments 1-8. The densities of embodiments 1-8 are higher than 99%, while the standard deviation of the density is no more than 0.03%.

TABLE 3

| Embodiment | 1 | 2 | 3 | 4 | 5 | 6 | 7 | 8 |
|---|---|---|---|---|---|---|---|---|
| Density | 99.90% | 99.70% | 99.97% | 99.96% | 99.91% | 99.80% | 99.95% | 99.96% |
| Standard deviation | 0.01% | 0.02% | 0.01% | 0.03% | 0.01% | 0.01% | 0.04% | 0.01% |

Figure 16:
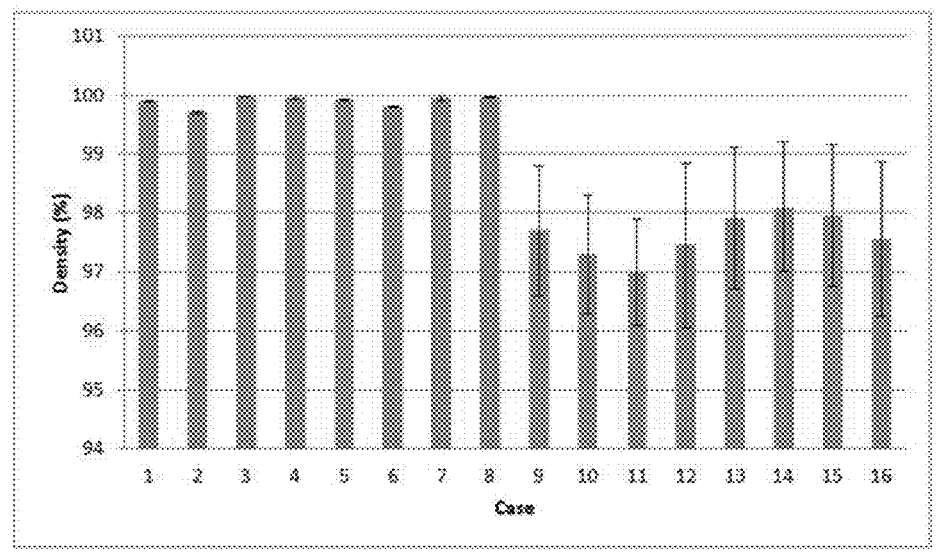
FIG. 16 shows a bar chart of density of embodiments and comparative examples.

To compare with the embodiments 1-8, comparative examples 1-8 are fabricated by using the same powder bed and laser as the embodiments 1-8, but using different parameter values, which are not the first group of parameter values. Table 4 shows the parameters values used in comparative examples 1-8. Similarly, the relative density of the cubes of comparative examples 1-8 are evaluated, which are shown in Table 5. The relative densities of comparative examples 1-8 are smaller than 99%, which cannot meet required standard. For comparison, FIG. 16 shows a bar chart of density of embodiments 1-8 and comparative examples 1-8. As shown in FIG. 16, the densities of embodiments 1-8 are all greater than that of comparative examples 1-8. Moreover, density deviations of embodiments 1-8 are smaller than that of comparative examples 1-8.

TABLE 4

| Comparative Example | 1 | 2 | 3 | 4 | 5 | 6 | 7 | 8 |
|---|---|---|---|---|---|---|---|---|
| Laser Power (W) | 180 | 180 | 200 | 200 | 240 | 240 | 290 | 290 |
| Scanning speed (mm/s) | 1100 | 1200 | 1200 | 1300 | 1400 | 1600 | 1700 | 1800 |
| Hatching space (μm) | 27 | 27 | 27 | 27 | 27 | 27 | 27 | 27 |
| Build-plate drop distance ($t_{machine}$) (μm) | 25 | 25 | 25 | 25 | 25 | 25 | 25 | 25 |

TABLE 5

| Comparative Example | 1 | 2 | 3 | 4 | 5 | 6 | 7 | 8 |
|---|---|---|---|---|---|---|---|---|
| Density | 97.7% | 97.3% | 97% | 97.45% | 97.91% | 98.10% | 97.95% | 97.56% |
| Standard deviation | 1.1% | 1.0% | 0.9% | 1.4% | 1.2% | 1.1% | 1.2% | 1.3% |

Figure 17:
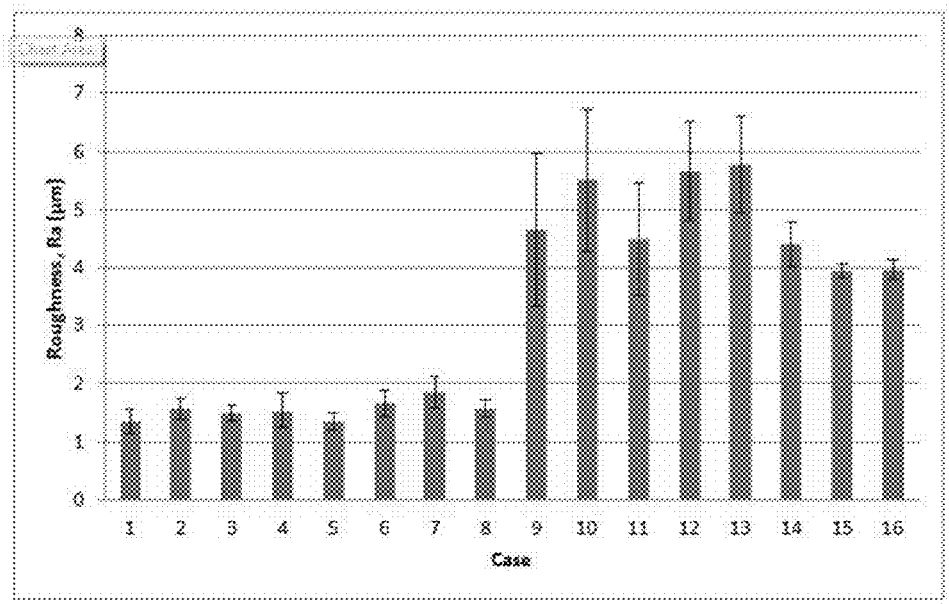
FIG. 17 shows a bar chart of surface roughness of embodiments and comparative examples.

Furthermore, surface roughness of top surface of embodiments 1-8 and comparative examples 1-8 are also measured. As shown in FIG. 17, which is a bar chart of surface roughness of embodiments 1-8 and comparative examples 1-8, the top surfaces of embodiments 1-8 are much smaller than that of comparative examples 1-8. Moreover, roughness deviations of embodiments 1-8 are also smaller than that of comparative examples 1-8. That is, the top surfaces of embodiments 1-8 are smoother than that of comparative examples 1-8.

According to the above, through the method 100, the optimal parameter combinations of the scanning speed and the laser power, which are the second group of parameter values in the above embodiments, can be determined, and the second group of parameter values used for SLM process can avoid the key-hole melting effect, ensure good adhesion between the melt pool and the substrate, produce a stable scan track, have good stability, suffer minimal distortion, and obtain lower surface roughness. Moreover, through the method 1100, the optimal parameter combination of the hatch space the scanning length, which are the first set of parameter values in the above embodiments, can be determined, and the first set of parameter values used for SLM process can avoid key-hole effect, preserve homogeneity, result in greater residual stress, and the obtained melt pools are smoother and flatter. The method 100 and the method 1100 are both effective and low-cost alternatives to traditional trial-and-error methods in determining the optimal processing parameters for the SLM process.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method of performing powder bed fusion process, comprising:
   providing a powder bed, wherein the powder bed includes a substrate and a powder layer, the powder layer contains a plurality of powders, and the powder layer is deposited on the substrate;
   obtaining a group of information of the powder bed, wherein the group of information of the powder bed includes a powder size distribution, material properties of the powders, and shape of the powders;
   performing a powder bed simulation to obtain a packing density corresponding to different thickness of the powder layer by using the group of information of the powder bed according to a first algorithm, wherein the packing density of the powder bed is higher than a predetermined packing density value;
   obtaining a group of parameters of a laser, wherein the group of parameters of the laser includes a laser type, and values of a laser power, a scanning speed, and a laser spot size;
   performing a Ray Tracing simulation for the powder layer to obtain an absorptivity profile along a depth of the powder layer by using material properties of the powders, the group of parameters of the laser, and the thickness of the powder bed according to a second algorithm;

performing a heat transfer simulation to obtain a peak temperature and a dimension of a melt pool by using the group of parameters of the laser, a temperature of the substrate, the thickness of the powder layer, and the absorptivity profile according to a third algorithm, wherein the dimension of the melt pool includes a length, a contact width, and a depth of the melt pool;

constructing a first surrogate model to obtain a plurality of first processing maps for different thickness of the powder layer by inputting the peak temperature and the dimension of the melt pool in to artificial neural networks, wherein the first processing maps includes a number of points, and each point is corresponding to a combination of a scanning speed value and a laser power value;

calculating a depth of the melt pool of each point in the first processing maps by inputting the scanning speed value and the laser power value into the first surrogate model;

comparing the depth of the melt pool of each point with a predetermined depth value,
  when the depths of the melt pool of the points are smaller than the predetermined depth value, the points in the first processing maps are not applicable;
  when the depths of the melt pool of the points are greater than the predetermined depth value, comparing the depth of the melt pool with a laser beam radius,
    when the depths of the melt pool of the points are greater than the laser beam radius, the points in the first processing maps are not applicable;
    when the depths of the melt pool of the points are smaller than the laser beam radius, performing a parameter setting operation by setting the points in the first processing maps as a first group of parameter values;

performing a plurality of cycles of selective laser melting operation on a workpiece, wherein each cycle of selective laser melting operation including:
  performing the parameter setting operation by a controller using the first group of parameter values;
  performing a laser melting operation on the powder layer of the workpiece; and
  measuring a temperature distribution on a top surface of a solidified layer by using an infrared thermal camera, wherein the solidified layer is the powder layer melted by the laser and solidified.

2. The method of claim 1, further comprising comparing a ratio of the first group of parameter values to the points of the first processing maps with a predetermined ratio,
  when the ratio of the first group of parameter values to the points of the first processing maps is greater than the predetermined ratio, using the greatest thickness of the powder bed to calculate a built-plate drop down distance;
  when the ratio of the first group of parameter value to the points of the first processing maps is smaller than the predetermined ratio, re-adjusting the thickness of the powder bed.

3. The method of claim 2, further comprising:
calculating a ratio of a diameter to the length of the melt pool, wherein the diameter of the melt pool is determined by the dimension of the melt pool, and the dimension of the melt pool is predicted by using the first group of parameter values; and judging stability of the melt pool with the first group of parameter values by using the dimension of the melt pool according to a stability criterion algorithm,
  when the points of the first group of parameter values do not satisfy the stability criterion algorithm, the points are removed from the first group of parameter values;
  when the points of the first group of parameter values satisfy the stability criterion algorithm, comparing the peak temperature with a predetermined temperature,
    when the peak temperature is higher than the predetermined temperature, the points are removed from the first group of parameter values;
    when the peak temperature is lower than the predetermined temperature, performing the parameter setting operation by setting the points as the first group of parameter values.

4. The method of claim 1, before performing the cycles of selective laser melting operation, further comprising:
performing the heat transfer simulation by using a plurality of temperatures of the substrate;
constructing the first surrogate models to obtain the first processing maps corresponding to the temperatures;
overlapping the first groups of parameter values with each other corresponding to the temperatures to obtain a second group of parameter values; and
performing the parameter setting operation by a controller using the second group of parameter values.

5. The method of claim 4, wherein the temperature distribution of the solidified layer is within a range of the temperatures, and the cycles of selective laser melting operation is performed on the workpiece.

6. The method of claim 1, further comprising obtaining speckle images by a digital camera to compare surface roughness of the workpiece after performing a single scan track on the workpiece by using the first group of parameter values.

7. The method of claim 6, further comprising:
dividing the first group of parameter values into two subgroups according to the scanning speed values;
comparing the surface roughness of the workpieces respectively fabricated by using the two subgroups of first group of parameter values; and
performing the parameter setting operation by using one of the two subgroups of the first group of parameter values, wherein the one of the two subgroups of the first group of parameter values is used to obtain a portion of the workpieces having lower surface roughness.

8. The method of claim 7, further comprising performing a double-scanning heat transfer simulation to obtain another peak temperature and dimensions of the melt pool by using one of the two subgroups of the first group of parameter values.

9. The method of claim 8, wherein the double-scanning heat transfer simulation includes an unidirectional mode and a bi-directional mode.

10. The method of claim 8, further comprising constructing second surrogate models to obtain a plurality of second processing maps by inputting the another peak temperature and the dimensions of the melt pool into the artificial neural networks, wherein the second processing maps include a number of points, and each point is corresponding to a combination of a scanning length value and a hatching space value.

11. The method of claim 10, before performing the parameter setting operation, further comprising comparing the another peak temperature with an evaporation point of the powders,
- when the another peak temperature is lower than the evaporation point, the points of the second processing maps are a first set of parameter values;
- when the another peak temperature is higher than the evaporation point, the points of the second processing maps are removed from the first set of parameter values; and
- performing the parameter setting operation by using the first set of parameter values.

12. The method of claim 11, before performing the parameter setting operation, further comprising calculating differences in depths of the melt pools and comparing the differences in depths with a predetermined difference,
- when the differences in depths are lower than the predetermined difference, the points of the second processing maps are the first set of parameter values;
- when the differences in depths are greater than the predetermined difference, the points of the second processing maps are removed from the first set of parameter values; and
- performing the parameter setting operation by using the first set of parameter values.

13. The method of claim 12, further comprising calculating overlap rates of the melt pools and comparing the overlap rates with a predetermined rate,
- when the overlap rates are greater than a predetermined rate, the points of the second processing maps are the first set of parameter values;
- when the overlap rates are lower than the predetermined rate, the points of the second processing maps are removed from the first set of parameter values; and
- performing the parameter setting operation by using the first set of parameter values.

14. The method of claim 1, wherein the absorptivity of the substrate is not 0.

15. The method of claim 1, wherein the first algorithm includes a sequential addition model.

16. The method of claim 1, wherein the second algorithm includes Monte Carlo Ray Tracing Simulation.

17. The method of claim 1, wherein the third algorithm includes finite element heat transfer simulation.

18. The method of claim 1, wherein the powders include metal, polymer material and/or ceramic material.

19. The method of claim 1, wherein the shape of the powders includes irregular shape and spherical shape.

\* \* \* \* \*